US008943165B2

(12) United States Patent
Zhou et al.

(10) Patent No.: US 8,943,165 B2
(45) Date of Patent: Jan. 27, 2015

(54) METHOD FOR RESELECTING BEARER BINDING AND EVENT REPORT FUNCTION

(75) Inventors: Xiaoyun Zhou, Guangdong Province (CN); Zaifeng Zong, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 486 days.

(21) Appl. No.: 13/258,184

(22) PCT Filed: Dec. 3, 2009

(86) PCT No.: PCT/CN2009/075297
§ 371 (c)(1),
(2), (4) Date: Jan. 19, 2012

(87) PCT Pub. No.: WO2011/011943
PCT Pub. Date: Feb. 3, 2011

(65) Prior Publication Data
US 2012/0117251 A1 May 10, 2012

(30) Foreign Application Priority Data
Jul. 27, 2009 (CN) .......................... 2009 1 0150199

(51) Int. Cl.
*G06F 15/16* (2006.01)
*H04W 76/02* (2009.01)
(Continued)

(52) U.S. Cl.
CPC ......... *H04W 76/022* (2013.01); *H04L 41/0893* (2013.01); *H04W 36/0011* (2013.01); *H04M 15/66* (2013.01)
USPC ....................................................... 709/217

(58) Field of Classification Search
None
See application file for complete search history.

(56) References Cited

U.S. PATENT DOCUMENTS

| 8,793,396 B2* | 7/2014 | Zhou et al. ................... 709/238 |
| 2011/0138005 A1* | 6/2011 | Zhou et al. ................... 709/206 |

(Continued)

FOREIGN PATENT DOCUMENTS

| CN | 101286915 A | 10/2008 |
| CN | 101459951 A | 6/2009 |
| WO | 2008096258 A1 | 8/2008 |

OTHER PUBLICATIONS

"Network-Based Mobility Management in the Evolved 3GPP Core Network"; Irfan Ali, Motorola Inc.; Alessio Casati, Alcatel-Lucent; Kuntal Chowdhury, Starent Networks; Katsutoshi Nishida, NTT DoCoMo Inc.; Eric Parsons, Nortel Networks; Stefan Schmid, NEC Europe Ltd.; Rahul Vaidya, Samsung India Software Operations; LTE-3GPP Release8; XP11280740A; see pp. 58-66.

(Continued)

*Primary Examiner* — Brian P Whipple
(74) *Attorney, Agent, or Firm* — Ling Wu; Stephen Yang; Ling and Yang Intellectual Property

(57) ABSTRACT

The invention provides a method for a Bearer Binding and Event Report Function (BBERF) relocation, which is used in a process of the BBERF relocation after establishing a first Internet Protocol (IP) Connectivity Access Network (IP-CAN) session for User Equipment (UE) and establishing a first gateway control session, a first Gx session, an S9 session and a first subsession of the S9 session which are used to perform policy control to said first IP-CAN session in an Evolved Packet System. In the process of the BBERF relocation, a subsession of the S9 session established before handover of UE is linked to the gateway control session established between the destination BBERF and the visited PCRF and the corresponding Gx session according to the session identity information, thereby achieving deferred linking of policy and charging sessions in roaming scenarios of home routed and local breakout.

20 Claims, 11 Drawing Sheets

(51) Int. Cl.
*H04L 12/24* (2006.01)
*H04W 36/00* (2009.01)
*H04M 15/00* (2006.01)

(56) References Cited

U.S. PATENT DOCUMENTS

| | | | |
|---|---|---|---|
| 2011/0161504 A1* | 6/2011 | Zhou et al. | 709/227 |
| 2012/0059942 A1* | 3/2012 | Hu et al. | 709/227 |
| 2012/0102174 A1* | 4/2012 | Zhou et al. | 709/223 |
| 2012/0110193 A1* | 5/2012 | Zhou et al. | 709/227 |
| 2012/0124220 A1* | 5/2012 | Zhou et al. | 709/227 |

OTHER PUBLICATIONS

"Policy and Charging Control in the Evolved Packet System"; Jose-Javier Pastor Balbas, Ericsson, Spain; Stefan Rommer and John Stenfelt, Ericsson, Sweden; LET-3GPP Release8; XP11280741A; see pp. 68-74.

* cited by examiner

METHOD FOR RESELECTING BEARER BINDING AND EVENT REPORT FUNCTION

TECHNICAL FIELD

The invention relates to the communication field and, in particular, to a method for a Bearer Binding and Event Report Function (BBERF) relocation.

BACKGROUND OF THE RELATED ART

The Evolved Packet System (EPS) of the 3$^{rd}$ Generation Partnership Project (3GPP) is composed by the Evolved Universal Terrestrial Radio Access Network (E-UTRAN), the Mobility Management Entity (MME), the Serving Gateway (S-GW), the Packet Data Network Gateway (P-GW), the Home Subscriber Server (HSS), the 3GPP Authentication Authorization Accounting server (3GPP AAA server), the Policy and Charging Rules Function (PCRF) and other support nodes.

FIG. 1 is a schematic diagram showing the system architecture of EPS in the related art, wherein MME is responsible for related work of the control plane such as mobility management, processing of non access stratum signaling and management of the user's mobility management context; S-GW is access gateway equipment connected to E-UTRAN and is used to forward data between E-UTRAN and P-GW and is responsible for caching paging waiting data; P-GW is a border gateway between EPS and the Packet Data Network (PDN) and is in charge of functions such as access of PDN and forwarding data and so on between EPS and PDN.

EPS supports interconnection with the non-3GPP network and implements the interconnection with the non-3GPP network by S2a/b/c interfaces. The non-3GPP network includes a trusted non-3GPP network and an untrusted non-3GPP network. Internet Protocol (IP) access of the trusted non-3GPP network can be directly connected with P-GW by the S2a interface; IP access of the untrusted non-3GPP network needs to be connected with P-GW through the (Evolved Packet Data Gateway (ePDG), wherein ePDG and P-GW are connected by the S2b interface.

If an EPS system supports Policy and Charging Control (PCC), then PCRF makes policy and charging rules; PCRF is connected to an IP service network of the operator through a receiving interface Rx to obtain service information. In addition, PCRF is connected with gateway equipment in a network by the Gx/Gxa/Gxc interface and is in charge of initiating establishment of the IP bearer, ensuring Quality of Service (QoS) of service data, and performing charging control, wherein Policy and Charging Enforcement Function (PCEF) is located at P-GW, and PCRF and P-GW exchange information through a Gx interface. When the interface between P-GW and S-GW is based on Proxy Mobile IP (PMIP), a Bearer Binding and Even Report Function (BBERF) exists in S-GW, and information between S-GW and PCRF is exchanged via a Gxc interface. When UE accesses the untrusted non-3GPP network, there is also a BBERF residing in S-GW, and the access gateway of the trusted non-3GPP network and PCRF exchange information through the Gxc interface. When User Equipment (UE) is roaming, an interface between the home PCRF and the visited PCRF is an S9 interface, and meanwhile an Application Function (AF) providing services for UE is located at a service network and sends service information for generating the PCC policy to PCRF through an Rx interface.

In the related art, the protocols applied in the PCC architecture are Diameter application protocols developed on the basis of the Diameter Base protocol; for example, the application protocol applied in a Gx interface, the application protocol applied in an Rx interface, the application protocol applied in a Gxx interface (including Gxa and Gxc interfaces) and the application protocol applied in a roaming interface S9 and so on. These application protocols define messages, commands and Attribute Value Pairs (AVP) and so on for PCC. The Diameter sessions established by these protocols can be respectively called as the Gx session, the gateway control session (Gxx session), the Rx session and the S9 session. The various function entities of PCC perform policy and charging control for the PDN connection established for UE accessing the network by these sessions. One IP connection from UE to PDN is generally called as one IP Connectivity Access Network (IP-CAN) session. One important operation enforced by PCRF is to link the Gx session, Gxx session and S9 session for performing policy and charging control to an identical IP-CAN session. The linking operation is performed in the process of establishing and modifying an IP-CAN session. In this text, the above Diameter sessions are called as the policy and charging control session.

FIG. 2 is a flowchart showing initial attachment where UE accesses EPS through E-UTRAN and establishes a PDN connection (i.e., an IP-CAN session), wherein a PMIPv6 protocol is applied between S-GW and P-GW. The procedure illustrated in FIG. 2 comprises the following steps.

Step S201: UE sends an attachment request message to eNodeB (Evolved Node B, that is, base station, called eNB for short) to request for accessing EPS.

Step S202: eNodeB sends the attachment request message to MME.

Step S203: the network authenticates UE and starts Non Access Stratum (NAS) security encryption protection.

Step S204: MME interacts with HSS to enforce a location update procedure after authenticating UE.

Step S205: MME selects P-GW for UE according to a default Access Point Name (APN) subscribed by the user and selects S-GW, and MME sends an establishment default bearer request message to the selected S-GW; "APN" represents "default APN" hereinafter in the absence of ambiguity.

Step S206: BBERF located at S-GW sends a gateway Control session establishment indication message to PCRF, wherein the gateway control session establishment indication message includes a user identity Network Access Identifier (NAI), a PDN identity APN and bearer attributes of the current access network and so on; the gateway control session (Gxx session) that this gateway control session establishment indication message makes a request for establishing is represented as Gxx session1;

wherein the bearer attributes of the access network includes: an IP-CAN type and a BBERF address; in addition, the bearer attributes of the access network can further include a Radio Access Technology (RAT) type.

Step S207: PCRF obtains user subscription information according to the user identity NAI and PDN identity APN, thereby making policies according to the user subscription information, network policies and bearer attributes of the current access network (including the IP-CAN type, or the IP-CAN type and the RAT type), and at this time the policy made by PCRF is a default policy for the user accessing this APN, including PCC rules, QoS rules and event triggers;

PCRF returns a gateway control session establishment acknowledgement message to BBERF and sends the made QoS rules and event triggers to BBERF; BBERF installs and enforces QoS rules and event triggers.

Step S208: S-GW sends a proxy binding update message to P-GW selected by MME in step S205, wherein the proxy binding update message includes the user identity NAI, PDN identity APN and bearer attributes of the access network (including the IP-CAN type, or the IP-CAN type and the RAT type).

Step S209: P-GW allocates an IP address for a PDN connection that is requested to establish for UE access, wherein the IP address is represented as IP Address1;

PCEF located at P-GW sends an IP-CAN session establishment indication message to PCRF, wherein this IP-CAN session establishment indication message includes the user identity NAI, PDN identity APN, IP Address1 and bearer attributes of the access network (including the IP-CAN type, or the IP-CAN type and the RAT type); the bearer attributes of the access network in this IP-CAN session establishment indication message are obtained in Step S208; and Gx session that this IP-CAN session establishment indication message requests to establish is represented as Gx session 1.

Step S210: PCRF links Gxx session1 to Gx session1 according to NAI and APN, that is, Gxx session1 and Gx session1 are used to perform policy and charging control to a PDN connection (i.e., the IP-CAN session) that UE requests to establish.

Step S211: PCRF returns an IP-CAN session establishment acknowledgement message to PCEF and sends the PCC rules and event triggers made in Step S207 to PCEF; the PCEF installs and enforces PCC rules and event triggers;

PCRF may modify the PCC rules and QoS rules according to the bearer attributes of the access network reported in Step S209, and at this time PCRF will send the modified PCC rules and QoS rules respectively to PCEF and BBERF for update.

Step S212: P-GW returns a proxy binding acknowledgement message including the IP Address1 to S-GW.

Step S213: S-GW returns an establishment default bearer reply message including the IP Address1 to MME.

Step S214: MME returns an attachment acceptance message including the IP Address1 to eNodeB.

Step S215: eNodeB returns an attachment acceptance message including the IP Address1 to UE.

Step S216: UE sends an attachment completion message to eNodeB.

Step S217: eNodeB sends an attachment completion message to MME.

Step S218: MME and S-GW perform an interaction procedure for updating the bearer.

Step S219: MME acquires that UE can access non-3GPP according to the user subscription information, and therefore sends the address of P-GW selected for UE establishing the PDN connection (i.e., the IP-CAN session) to HSS; HSS returns a reply message after storing this P-GW address.

According to the procedure illustrated in FIG. 2, UE has established a PDN connection (i.e., the IP-CAN session) to default APN; and thereafter UE can access dedicated services through this connection, and PCRF will make PCC rules and QoS rules according to information such as service features, user subscription information, network policies and bearer attributes of the access network and so on. Since linking is performed in Step S210, PCRF can send PCC rules to PCEF by Gx session1 and send QoS rules to BBERF by Gxx session1. When BBERF requests new QoS rules or modifies QoS rules through Gxx session1, PCRF will also make corresponding PCC rules or modify corresponding PCC rules and send the PCC rules to PCEF by Gx session1, and vice versa.

When inter-system handover or inter-S-GW handover (i.e., BBERF relocation) takes place in UE, PCRF needs to enforce a new linking operation.

FIG. 3 is a flowchart showing that UE switches from E-UT-RAN to a trusted non-3GPP access system after accessing to EPS using the procedure illustrated in FIG. 2, wherein through non-3GPP access, PMIPv6 protocol is applied between trusted non-3GPP access gateway and P-GW. The procedure illustrated in FIG. 3 comprises the following steps.

Step S301: UE establishes a PDN connection (i.e., an IP-CAN session) through 3GPP access, wherein there is a PMIPv6 tunnel between S-GW and P-GW.

Step S302: UE finds a trusted non-3GPP access system and decides handover of the current session from 3GPP access to this trusted non-3GPP access system.

Step S303: UE, the trusted non-3GPP access gateway and HSS/AAA perform an Extensible Authentication Protocol (EAP) authentication process, in which HSS/AAA returns the address of P-GW selected when the access of UE is based on 3GPP to the trusted non-3GPP access gateway.

Step S304: the layer 3 attachment procedure specific to non-3GPP access is triggered after authentication and authorization succeed; in this process, UE indicates the network that UE has the IP address maintaining capacity.

Step S305: BBERF located at the trusted non-3GPP access gateway sends a gateway control session establishment indication message including the user identity NAI, PDN identity APN and bearer attributes of the current access network (including the new IP-CAN type, new RAT type and new BBERF address) to PCRF; the gateway control session (Gxx session) that this message requests to establish is represented as Gxx session 2.

Step S306: PCRF links Gxx session2 to Gx session1 established in the procedure illustrated in FIG. 2 according to the user identity NAI and the PDN identity APN.

Step S307: PCRF makes QoS rules and event triggers, which include the policy made by PCRF for UE when UE accesses dedicated services through 3GPP access, for UE during non-3GPP access according to user subscription information, network policies and bearer attributes of the current access network;

PCRF sends the above QoS rules and event triggers to BBERF by a gateway control session establishment acknowledgement message; BBERF installs and enforces the QoS rules and event triggers; the trusted non-3GPP access gateway enforces a specific non-3GPP access procedure for resource reservation.

Step S308: the trusted non-3GPP access gateway sends a proxy binding update message including the user identity NAI, PDN identity APN and bearer attributes of the current access network (including the IP-CAN type, or the IP-CAN type and RAT type) to corresponding P-GW according to a P-GW address obtained in Step 303.

Step S309: P-GW allocates an IP address (IP Address1) used by UE during 3GPP access for UE according to the user identity NAI and PDN identity APN so as to maintain IP address unchanged, thereby ensuring continuity of services;

PCEF located at P-GW sends an IP-CAN session modification indication message including bearer attributes of the new access network obtained in step S308 to PCRF; this message modifies Gx session1 established in the procedure illustrated in FIG. 2.

Step S310: PCRF determines that the handover (i.e., handover from 3GPP to non-3GPP) occurs in the tunnel of a PDN connection (i.e., IP-CAN session) established by UE, and therefore PCRF modifies PCC rules for a reestablished PDN connection (i.e., IP-CAN session) according to bearer attributes of the new access network and returns the modified PCC rules to PCEF by an IP-CAN session modification acknowledgement message for update.

Step S311: P-GW returns a proxy binding acknowledgement message including IP Address1 to the trusted non-3GPP access network.

Step S312: the trusted non-3GPP access network returns a layer 3 attachment completion message including IP Address1 to UE.

Step S313: UE performs handover on the PDN connection from 3GPP access to trusted non-3GPP access, wherein there is a PMIPv6 tunnel between the trusted non-3GPP access gateway and P-GW (this PMIPv6 tunnel is established by Steps S308 and S311); the services accessed by UE during 3GPP access can be continuously accessed.

It can be seen from the procedure illustrated in FIG. 3 that PCRF links a new gateway control session (Gxx session) to an established PDN connection (IP-CAN session) according to the user identity NAI and PDN identity APN in Step S306, so that PCRF can update the policy made by PCRF for UE when UE accesses a 3GPP system according to bearer attributes of the new access network and then send the policy to new BBERF by this new gateway control session (Gxx session), thereby ensuring that a non-3GPP access system has performed resource reservation for the services which UE previously accessed before handover occurring in the PMIPv6 tunnel (i.e., before Step S308), accelerating the handover speed and improving user experience.

However, not all UEs can implement a handover procedure (i.e., maintaining IP address unchanged). When a network cannot determine whether UE has a network mobility capacity (i.e., IP address maintaining capacity), the P-GW would decide whether to allocate a new IP address (i.e., establishing a new PDN connection) for UE or maintain the IP address unchanged (i.e., handover of the established PDN connection). However, this decision is made by P-GW after receiving the proxy binding update message sent by the trusted non-3GPP access network gateway. At that time, PCRF has made a decision to link a new gateway control session (Gxx session) to an existing PDN connection (i.e., PCRF has made a decision of handover). If at this time P-GW decides to establish a new PDN connection rather than perform handover, it necessarily results in inconsistency of the policy sent by PCRF with the decision of P-GW, thereby causing occurrence of the error. The method for solving this problem in the related art is as follows.

(1) When the access gateway cannot determine whether UE has a network mobility capacity, an deferred linking indication is included in the gateway control session establishment indication message sent by BBERF located at the access gateway to PCRF, and PCRF does not immediately link the established gateway control session (Gxx session) (i.e., Gxx session2 in FIG. 3) to the existing PDN connection (IP-CAN) after receiving the deferred linking indication.

(2) If P-GW decides to perform handover, PCEF located at P-GW sends an IP-CAN session modification indication message to PCRF for modifying the established Gx session (i.e., Gx session1 in FIG. 3), and at this time PCRF links a newly established gateway control session (Gxx session) (i.e., Gxx session2) to the established PDN connection (IP-CAN session) (i.e., linking Gxx session2 to Gx session1);

(3) if P-GW decides to newly establish a PDN connection (IP-CAN session) instead of not performing handover, P-GW allocates a new IP address (represented as IP Address2) for UE; PCEF located at P-GW sends an IP-CAN session establishment indication message including the user identity NAI, PDN identity APN and IP Address2 to PCRF for requesting to establish a new Gx session (represented as Gx session2); at this time PCRF decides to link the newly established gateway control session (Gxx session) to the newly established Gx session. In this case, the dedicated services which UE previously accessed through 3GPP access will be interrupted, and UE needs to reinitiates a service request and PCRF remakes a policy for UE.

The above method that does not immediately link the gateway control session to the existing PDN connection (IP-CAN) is called as deferred linking.

Only the method for implementing deferred linking of the policy and charging control session in non-roaming scenarios was discussed in the related art. The related art does not involve the roaming scenarios.

There are two kinds of roaming architectures in EPS: the first one is home routed and the second one is local breakout. FIG. 4 is a diagram showing the home routed EPS roaming architecture in the related art. As illustrated in FIG. 4, P-GW is in home network and an IP service is provided by the home network operator (i.e., AF is in home network). FIG. 5 is a diagram showing the local breakout EPS roaming architecture in the related art. As illustrated in FIG. 5, P-GW is in the local network and an LP service can be provided by the home network operator (i.e., AF is at home network) or by the visited network operator (i.e., AF is in the visited network). As for different roaming scenarios, the procedures of PCC are different and the functions enforced by the PCC network element are also different.

Currently, in the scheme of implementing an S9 roaming interface, Visited PCRF (vPCRF) terminates the Gx sessions and gateway control sessions (Gxx sessions) of all IP-CAN sessions established by UE that exist in the visited network, that is, the gateway control session (Gxx session) and the Gx session would not be sent to the Home PCRF (hPCRF), but a S9 session is established between vPCRF and hPCRF, and this S9 session is used to transmit the information on the Gx sessions and the gateway control sessions (Gxx session) of all IP-CAN sessions. However, vPCRF does not terminate Rx sessions of all IP-CAN session in the visited network, but only forwards messages of Rx sessions to the home PCRF and takes vPCRF as one proxy. There may be a plurality of subsessions (called as S9 subsession) in one S9 session, and each subsession is used to transmit information on Gx and Gxx sessions of one IP-CAN session.

To sum up, due to complexity of EPS roaming scenarios and complexity of deferred linking of policy and charging control sessions itself in roaming scenarios, there are difficulties in implementing a method for implementing deferred linking of policy and charging control sessions in the roaming scenarios and the policy and charging control thereon, and there has not had a corresponding solution in the related art.

SUMMARY OF THE INVENTION

The technical problem to be solved in this invention is to overcome the deficiency in the related art and provide a method of implementing relocation of a Bearer Binding and Event Report Function in a roaming scenario so as to achieve deferred linking of policy and charging control sessions in a roaming scenario.

To solve the above problem, this invention provides a method for a Bearer Binding and Event Report Function (BBERF) relocation, which is used in a process of the BBERF relocation after establishing a first Internet Protocol (IP) Connectivity Access Network (IP-CAN) session for User Equipment (UE) and establishing a first gateway control session, a first Gx session, an S9 session and a first subsession of the S9 session which are used to perform policy control to said first IP-CAN session in an Evolved Packet System (EPS), and said method comprises:

establishing a second gateway control session between a destination BBERF and a visited Policy and Charging Rules Function (PCRF);

if an IP-CAN session modification indication message sent by a Policy and Charging Enforcement Function (PCEF) is received, the home PCRF linking said first Gx session that said IP-CAN session modification indication message requests to modify to said first subsession according to session identity information; or, if an IP-CAN session establishment indication message sent by said PCEF is received, said home PCRF linking a second Gx session, that said IP-CAN session establishment indication message requests to establish, for performing policy control to said second IP-CAN session to said first subsession according to session identity information; and said visited PCRF linking said second gateway control session to said first subsession after said establishing second gateway control session.

In addition, the step of establishing the second gateway control session between the destination BBERF and the visited PCRF comprises:

said destination BBERF sending a gateway control session establishment indication message to said visited PCRF;

after receiving said gateway control session establishment indication message, said visited PCRF including a deferred linking indication, session identity information and a bearer attribute of an access network, included in said gateway control session establishment indication message, in an S9 session modification indication message of said S9 session to send to a home PCRF;

after receiving said S9 session modification indication message, said home PCRF making a default Quality of Service (QoS) rule for a user according to said deferred linking indication, said session identity information and said bearer attribute of the access network, and including said default QoS rule in an S9 session modification acknowledgement message of said S9 session to send to said visited PCRF; and after receiving said S9 session modification acknowledgement message, said visited PCRF including said default QoS rule in a gateway control session establishment acknowledgement message to send to said, destination BBERF according to an address of the destination BBERF included in said S9 session modification acknowledgement message.

In addition, after the step of said home PCRF linking said first Gx session to said first subsession, said method further comprises: said home PCRF sending an S9 session and rules provision message of said first subsession to said visited PCRF to indicate said visited PCRF to maintain a linking relationship between said first subsession and said first gateway control session;

or after the step of said home PCRF linking said second Gx session to said first subsession, said method further comprises: said home PCRF sending an S9 session and rules provision message of said first subsession to said visited PCRF to indicate said visited PCRF to relieve a linking relationship between said first subsession and said first gateway control session.

In addition, after the step of said home PCRF linking said first Gx session to said first subsession, said method further comprises: said home PCRF modifying a Policy and Charging Control (PCC) rule and the QoS rule for a user, and sending said PCC rule to said PCEF by an IP-CAN session modification acknowledgement message of said first Gx session and sending said QoS rule to said visited PCRF by said S9 session and rules provision message; said visited PCRF including said QoS rule in a gateway control and QoS rules provision message of said second gateway control session to send to said destination BBERF according to an address of the destination BBERF included in said S9 session and rules provision message;

or after the step of said home PCRF linking said second Gx session to said first subsession, said method further comprises: said home PCRF making default PCC rule and QoS rule for a user, and sending said PCC rule to said PCEF by an IP-CAN session modification acknowledgement message of said second Gx session and sending said QoS rule to said visited PCRF by said S9 session and rules provision message; said visited PCRF including said QoS rule in a gateway control and QoS rules provision message of said second gateway control session to send to said destination BBERF.

In addition, said session identity information includes a user identity and a packet data network identity.

The present invention further provides a method for a Bearer Binding and Event Report Function (BBERF) relocation, which is used in a process of the BBERF relocation after establishing a first Internet Protocol (IP) Connectivity Access Network (IP-CAN) session for User Equipment (UE) and establishing a first gateway control session, a first Gx session, an S9 session and a first subsession of the S9 session which are used to perform policy control to said first IP-CAN session in an Evolved Packet System (EPS), and said method comprises:

establishing a second gateway control session between a destination BBERF and a visited Policy and Charging Rules Function (PCRF); and if an IP-CAN session modification indication message sent by a Policy and Charging Enforcement Function (PCEF) is received, said visited PCRF linking said first Gx session that said IP-CAN session modification indication message requests to modify to said second gateway control session and said first subsession according to session identity information; or if an IP-CAN session establishment indication message sent by said PCEF is received, said visited PCRF linking a second Gx session that said IP-CAN session establishment indication message requests to establish to said second gateway control session and said first subsession according to session identity information.

In addition, after the step of said visited PCRF linking said first Gx session to said second gateway control session and said first subsession, said method further comprises: said visited PCRF obtaining a policy, modified by a home PCRF for a user, through said first subsession, and sending a Policy and Charging Control (PCC) rule in said policy to said PCEF by said first Gx session and sending a Quality of Service (QoS) rule in said policy to said destination BBERF by said second gateway control session;

or after the step of said visited PCRF linking said second Gx session to said second gateway control session and said first subsession, said method further comprises: said visited PCRF obtaining a default policy, newly made by said home PCRF for the user, through said first subsession, and sending a PCC rule in said default policy to said PCEF by said second Gx session and sending a QoS rule in said default policy to said destination BBERF by said second gateway control session.

In addition, after the step of said visited PCRF linking said first Gx session to said second gateway control session and said first subsession, said method further comprising: said visited PCRF obtaining a policy, modified by a home PCRF for a user, through said first subsession and sending a Policy and Charging Control (PCC) rule in said policy to said PCEF by said first Gx session, and making a corresponding Quality of Service (QoS) rule according to said PCC rule and sending said QoS rule to said destination BBERF by said second gateway control session;

or after said visited PCRF linking said second Gx session to said second gateway control session and said first subsession, said method further comprising: said visited PCRF obtaining a default policy, newly made by said home PCRF for the user, through said first subsession and sending a PCC rule in said default policy to said PCEF by said second Gx session, and making a corresponding QoS rule according to said PCC rule and sending said QoS rule to said destination BBERF by said second gateway control session.

In addition, after the step of said visited PCRF linking said first Gx session to said second gateway control session and said first subsession, the step of said visited PCRF obtaining the policy modified by said home PCRF for the user comprises: said visited PCRF sending an S9 session modification indication message including an enforcement indication, for indicating said home PCRF to modify said policy for the user, to said home PCRF; after receiving said S9 session modification indication message, said home PCRF including said policy modified for the user in an S9 session modification acknowledgement message to send to said visited PCRF according to said enforcement indication;

or after the step of said visited PCRF linking said second Gx session to said second gateway control session and said first subsession, the step of said visited PCRF obtaining the default policy newly made by said home PCRF for the user comprises: said visited PCRF sending an S9 session modification indication message including an enforcement indication, for indicating said home PCRF to make said default policy for the user, to said home PCRF; after receiving said S9 session modification indication message, said home PCRF including said default policy made by said home PCRF for the user in an S9 session modification acknowledgement message to send to said visited PCRF according to said enforcement indication.

In addition, the step of establishing the second gateway control session between the destination BBERF and the visited PCRF comprises:

said destination BBERF sending a gateway control session establishment indication message including an deferred linking indication, a bearer attribute of an access network and session identity information to said visited PCRF; and after receiving said gateway control session establishment indication message, said visited PCRF searching a default Quality of Service (QoS) rule corresponding to said session identity information according to said deferred liking indication, modifying said default QoS rule according to said bearer attribute of the access network, and then sending the QoS rule to said destination BBERF through a gateway control session establishment acknowledgement message.

In addition, said session identity information includes a user identity and a packet data network identity.

The present invention further provides a system for a Bearer Binding and Event Report Function (BBERF) relocation, and the system comprises: a visited Policy and Charging Rule Function (PCRF), a home PCRF and a Policy and Charging Execution Function (PCEF), wherein after establishing a first IP Connectivity Access Network (IP-CAN) session for a User Equipment (UE) in an Evolved Packet System (EPS) and establishing a first gateway control session, a first Gx session, an S9 session and a first subsession of the S9 session that are used to perform policy control to the first IP-CAN session, and in a process of the BBERF relocation:

the PCEF is configured to: send an IP-CAN session modification indication message or an IP-CAN session establishment indication message to the visited PCRF;

the BBERF is configured to: establish a second gateway control session between a destination BBERF and a visited Policy and Charging Rules Function (PCRF) when the BBERF is the destination BBERF;

the visited PCRF is configured to: link said first Gx session that said IP-CAN session modification indication message requests to modify to said second gateway control session and said first subsession according to session identity information; or link a second Gx session that said IP-CAN session establishment indication message requests to establish to said second gateway control session and said first subsession according to session identity information.

the home PCRF is configured to: newly make a policy for a user and provide the policy to said visited PCRF through said first subsession.

In addition, said visited PCRF is further configured to: obtain a policy, modified by the home PCRF for the user, through said first subsession after linking said first Gx session to said second gateway control session and said first subsession, and send a Policy and Charging Control (PCC) rule in said policy to said PCEF by said first Gx session and send a Quality of Service (QoS) rule in said policy to said destination BBERF by said second gateway control session;

or said visited PCRF is further configured to: obtain a default policy newly made by said home PCRF for the user, through said first subsession after linking said second Gx session to said second gateway control session and said first subsession, and send a PCC rule in said default policy to said PCEF by said second Gx session and send a QoS rule in said default policy to said destination BBERF by said second gateway control session.

In addition, said visited PCRF is further configured to: obtain a policy, modified by the home PCRF for the user, through said first subsession after linking said first Gx session to said second gateway control session and said first subsession, and send a Policy and Charging Control (PCC) rule in said policy to said PCEF by said first Gx session, and make a corresponding Quality of Service (QoS) rule according to said PCC rule and then send said QoS rule to said destination BBERF by said second gateway control session;

or said visited PCRF is configured to: obtain a default policy, newly made by said home PCRF for the user, through said first subsession after linking said second Gx session to said second gateway control session and said first subsession, and send a PCC rule in said default policy to said PCEF by said second Gx session, and make a corresponding QoS rule according to said PCC rule and then send said QoS rule to said destination BBERF by said second gateway control session.

In addition, said visited PCRF is configured to obtain the policy modified by said home PCRF for the user in a following way: said visited PCRF sending an S9 session modification indication message including an enforcement indication, for indicating said home PCRF to modify said policy for the user, to said home PCRF; and receiving an S9 session modification acknowledgement message including said policy modified for the user sent form said home PCRF; and said home PCRF is further configured to: include said policy modified for the user in the S9 session modification acknowledgement message after receiving said S9 session modification indication message to send to said visited PCRF according to said enforcement indication;

or said visited PCRF is configured to obtain the policy modified by said home PCRF for the user in a following way: sending an S9 session modification indication message including an enforcement indication, for indicating said home PCRF to make said default policy for the user, to said home PCRF; and receiving an S9 session modification acknowledgement message including said default policy made by said home PCRF; and said home PCRF is further configured to: include said default policy made by said home PCRF for the user in the S9 session modification acknowledgement message to send to said visited PCRF according to said enforcement indication.

In addition, the BBERF is configured to establish a second gateway control session between the destination BBERF and the visited PCRF when the BBERF is the destination BBERF in a following way: said destination BBERF sending a gateway control session establishment indication message including an deferred linking indication, a bearer attribute of an access network and session identity information to said visited PCRF; and receiving a Quality of Service (QoS rule through a gateway control session establishment acknowledgement message;

said visited PCRF is further configured to: searching a default QoS rule corresponding to said session identity information according to said deferred liking indication, modify said default QoS rule according to said bearer attribute of the access network, and then send the QoS rule to said destination BBERF.

In addition, said session identity information includes a user identity and a packet data network identity.

The present invention further provides a policy and charging rule function (PCRF), which comprises a visited PCRF, wherein in a process of a Bearer Binding and Event Report Function (BBERF) relocation after establishing a first Internet Protocol (IP) Connectivity Access Network (IP-CAN) session for User Equipment (UE) and establishing a first gateway control session, a first Gx session, an S9 session and a first subsession of the S9 session which are used to perform policy control to said first IP-CAN session in an Evolved Packet System (EPS), the visited PCRF is configured to:

establish a second gateway control session with a destination BBERF; and receive an IP-CAN session modification indication message sent by a Policy and Charging Enforcement Function (PCEF), and link said first Gx session that said IP-CAN session modification indication message requests to modify to said second gateway control session and said first subsession according to session identity information; or receive an IP-CAN session establishment indication message sent by said PCEF, and link a second Gx session that said IP-CAN session establishment indication message requests to establish to said second gateway control session and said first subsession according to session identity information.

In the above PCRF, the visited PCRF is further configured to:

obtain a policy, modified by a home PCRF for a user, through said first subsession after linking said first Gx session to said second gateway control session and said first subsession, and send a Policy and Charging Control (PCC) rule in said policy to said PCEF by said first Gx session and send a Quality of Service (QoS) rule in said policy to said destination BBERF by said second gateway control session;

or obtain a default policy, newly made by said home PCRF for the user, through said first subsession after linking said second Gx session to said second gateway control session and said first subsession, and send a PCC rule in said default policy to said PCEF by said second Gx session and send a QoS rule in said default policy to said destination BBERF by said second gateway control session.

In addition, the visited PCRF is further configured to:

obtain a policy, modified by a home PCRF for a user, through said first subsession after linking said first Gx session to said second gateway control session and said first subsession, and send a Policy and Charging Control (PCC) rule in said policy to said PCEF by said first Gx session, and make a corresponding Quality of Service (QoS) rule according to said PCC rule and then send said QoS rule to said destination BBERF by said second gateway control session;

or obtain a default policy, newly made by said home PCRF for the user, through said first subsession after linking said second Gx session to said second gateway control session and said first subsession, and send a PCC rule in said default policy to said PCEF by said second Gx session, and make a corresponding QoS rule according to said PCC rule and sending said QoS rule to said destination BBERF by said second gateway control session.

In addition, said visited PCRF is configured to obtain the policy modified by said home PCRF for the user in a following way:

said visited PCRF sending an S9 session modification indication message including an enforcement indication, for indicating said home PCRF to modify said policy for the user, to said home PCRF; and receiving an S9 session modification acknowledgement message including said policy modified for the user sent by said home PCRF;

or said visited PCRF sending an S9 session modification indication message including an enforcement indication, for indicating said home PCRF to make said default policy for the user, to said home PCRF; and receiving an S9 session modification acknowledgement message including said default policy made by said home PCRF for the user sent from said home PCRF.

In addition, said visited PCRF is configured to establish the second gateway control session with the destination BBERF in a following way:

receiving a gateway control session establishment indication message including an deferred linking indication, a bearer attribute of an access network and session identity information sent from said destination BBERF; and after receiving said gateway control session establishment indication message, said visited PCRF searching a default Quality of Service (QoS) rule corresponding to said session identity information according to said deferred liking indication, modifying said default QoS rule according to said bearer attribute of the access network, and then sending the QoS rule to said destination BBERF through a gateway control session establishment acknowledgement message.

In addition, said session identity information includes a user identity and a packet data network identity.

To sum up, this invention links a subsession of the S9 session established before handover of UE to a gateway control session established between a destination BBERF and visited PCRF and a corresponding Gx session according to session identity information (including the user identity, and PDN identity and so on) in the process of BBERF relocation, thereby achieving deferred linking of policy and charging control sessions in roaming scenarios of the home routed and local breakout.

PREFERRED EMBODIMENTS OF THE PRESENT INVENTION

The core idea of this invention is to link a subsession of the S9 session established before handover of UE to a Gxx session established between a destination BBERF and visited PCRF and a corresponding Gx session according to session identity information (including the user identity, and PDN identity and so on) in the process of BBERF relocation, thereby achieving deferred linking of policy and charging control sessions in roaming scenarios of the home routed and local breakout.

The followings make specific description on a method of implementing deferred linking of a policy and charging control session in different roaming scenarios in the invention in detail in combination with accompanying drawings and embodiments.

Embodiment 1 (Home Routed)

Figure 1:
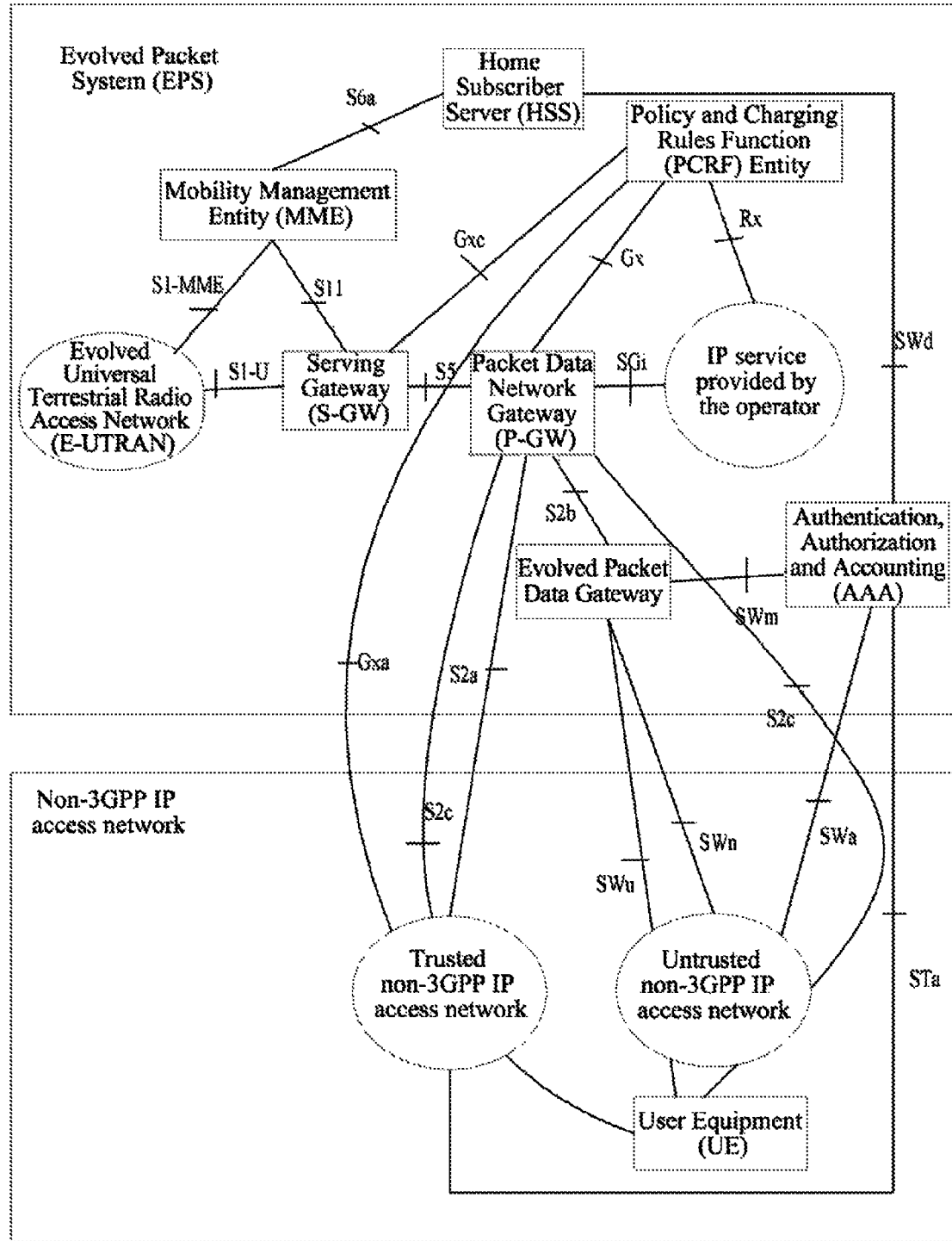
FIG. 1 is a schematic diagram showing the system architecture of EPS in the related art.
Figure 2:
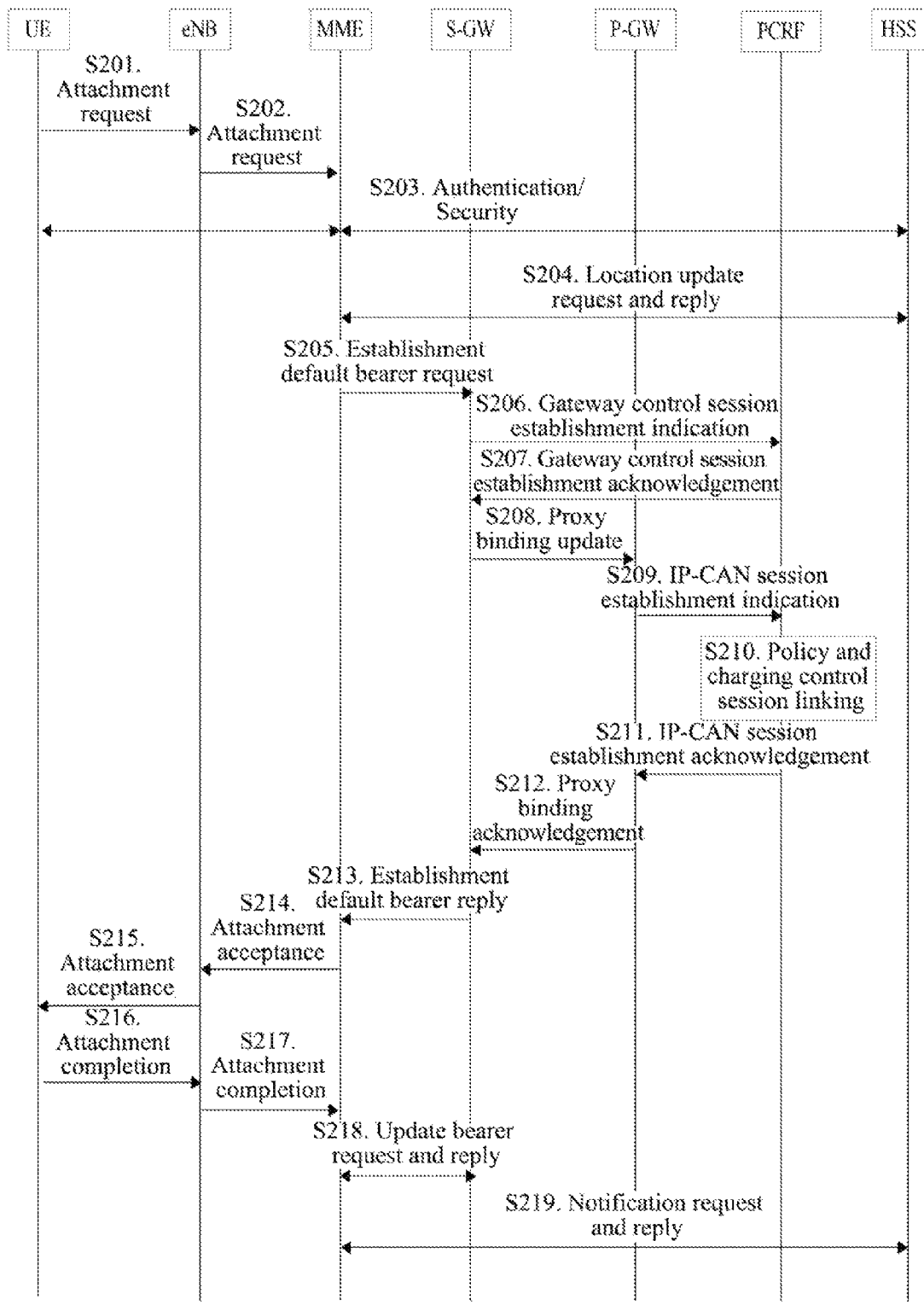
FIG. 2 is a flowchart showing the initial attachment where UE accesses EPS through E-UTRAN and establishes a PDN connection.
Figure 3:
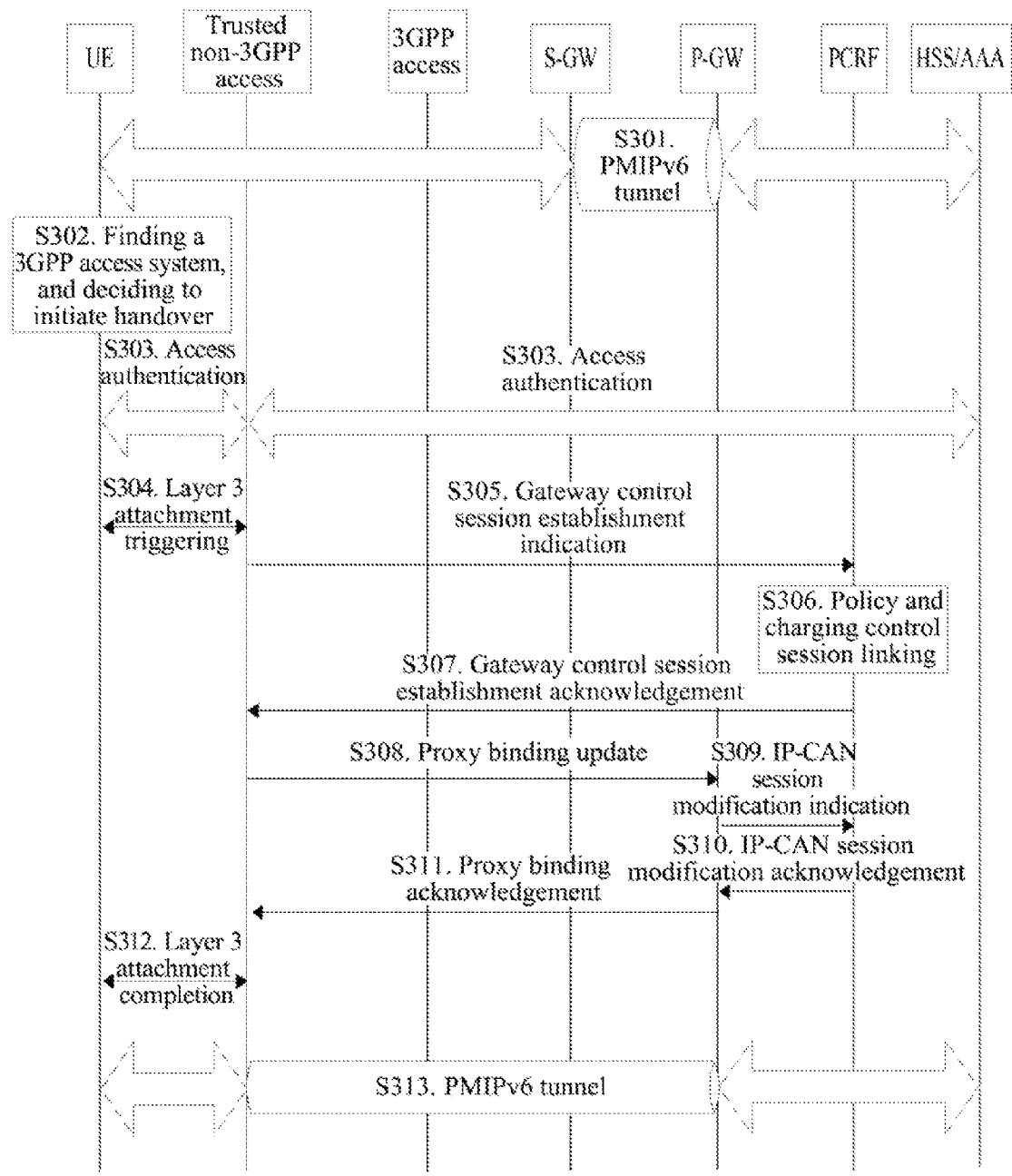
FIG. 3 is a flowchart showing handover of the UE from E-UTRAN to a trusted non-3GPP access system after accessing EPS using the procedure illustrated in FIG. 2.
Figure 4:
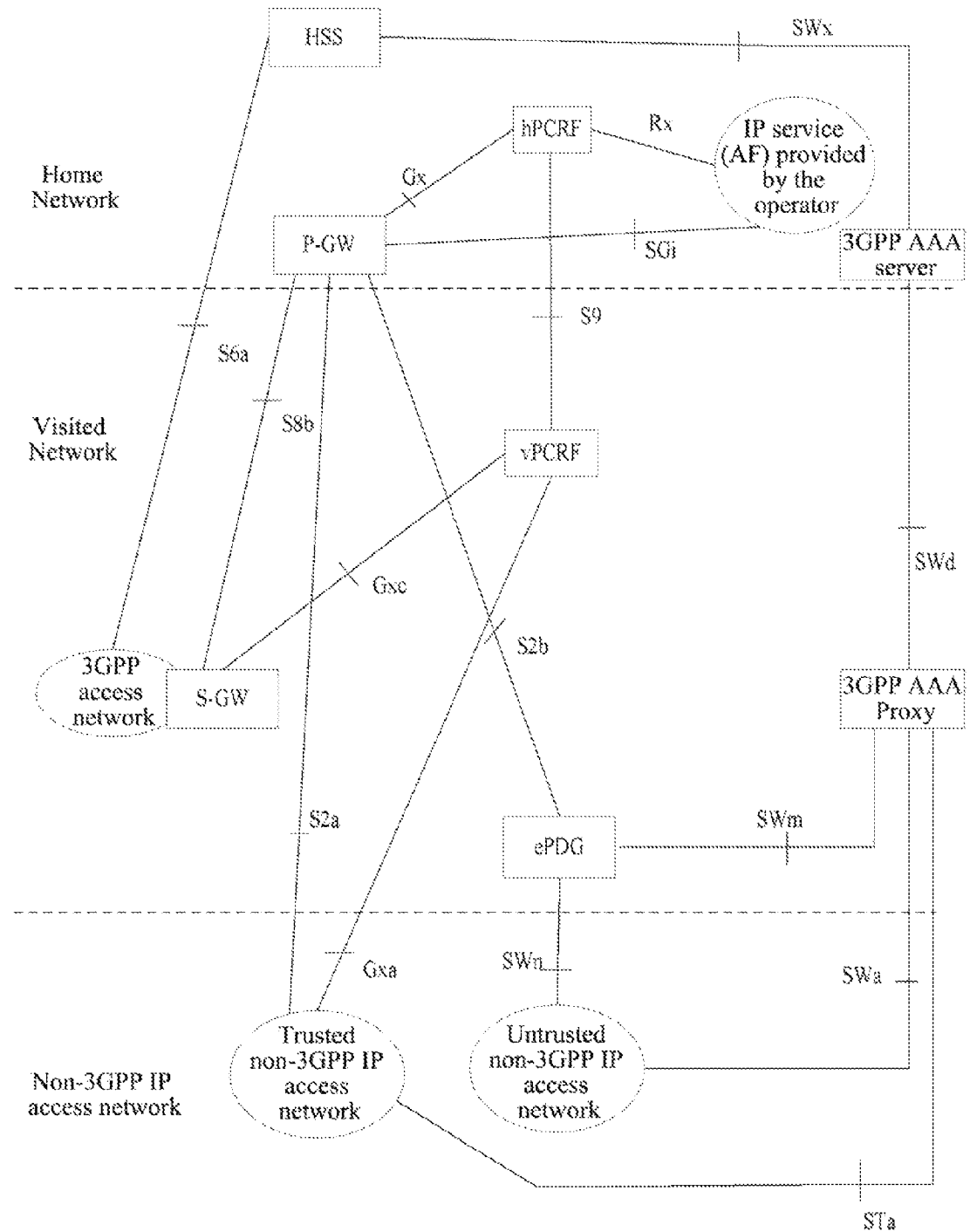
FIG. 4 is diagram showing the home routed EPS roaming architecture in the related art.
Figure 5:
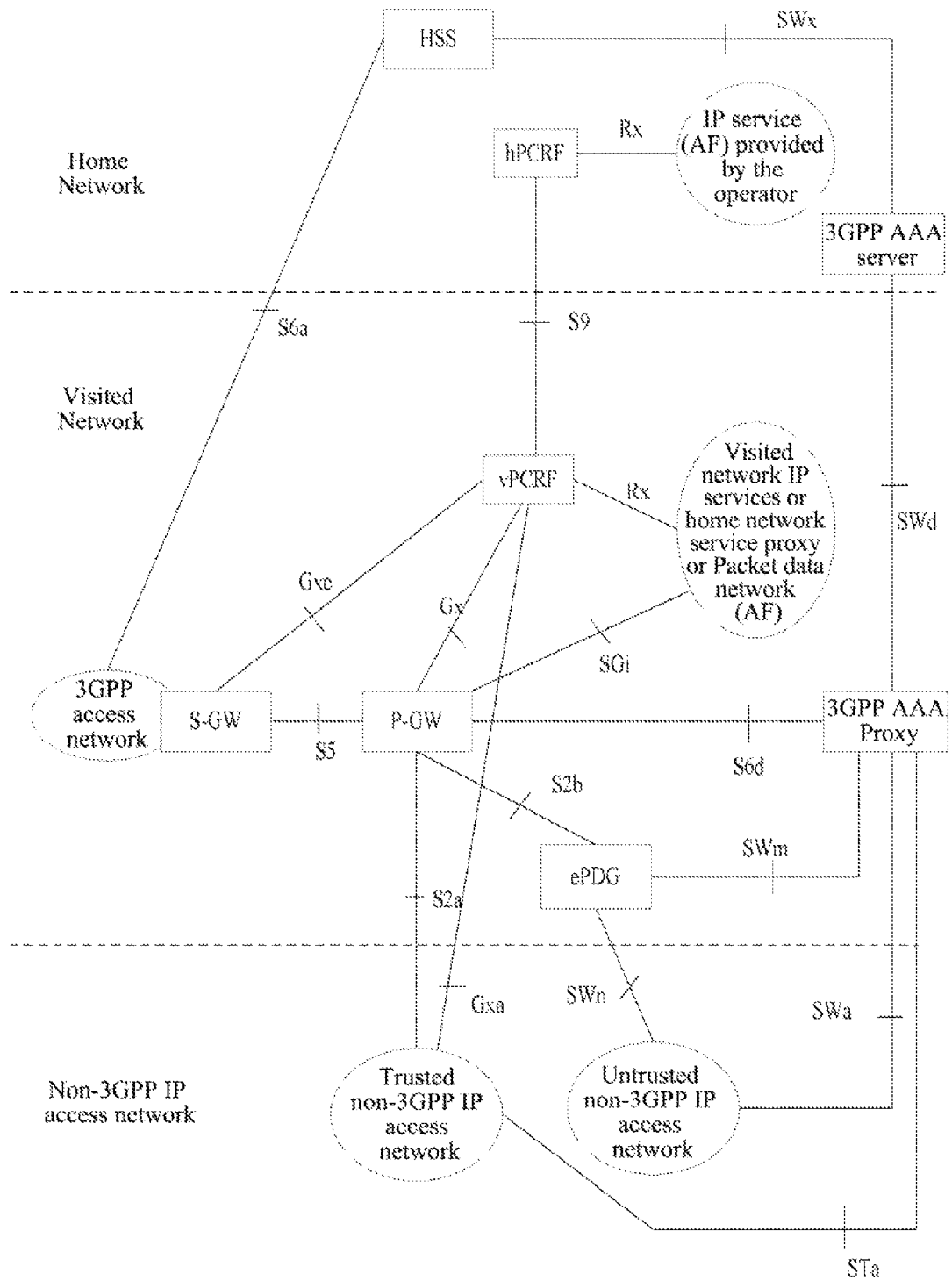
FIG. 5 is diagram showing the local breakout EPS roaming architecture in the related art.
Figure 6:
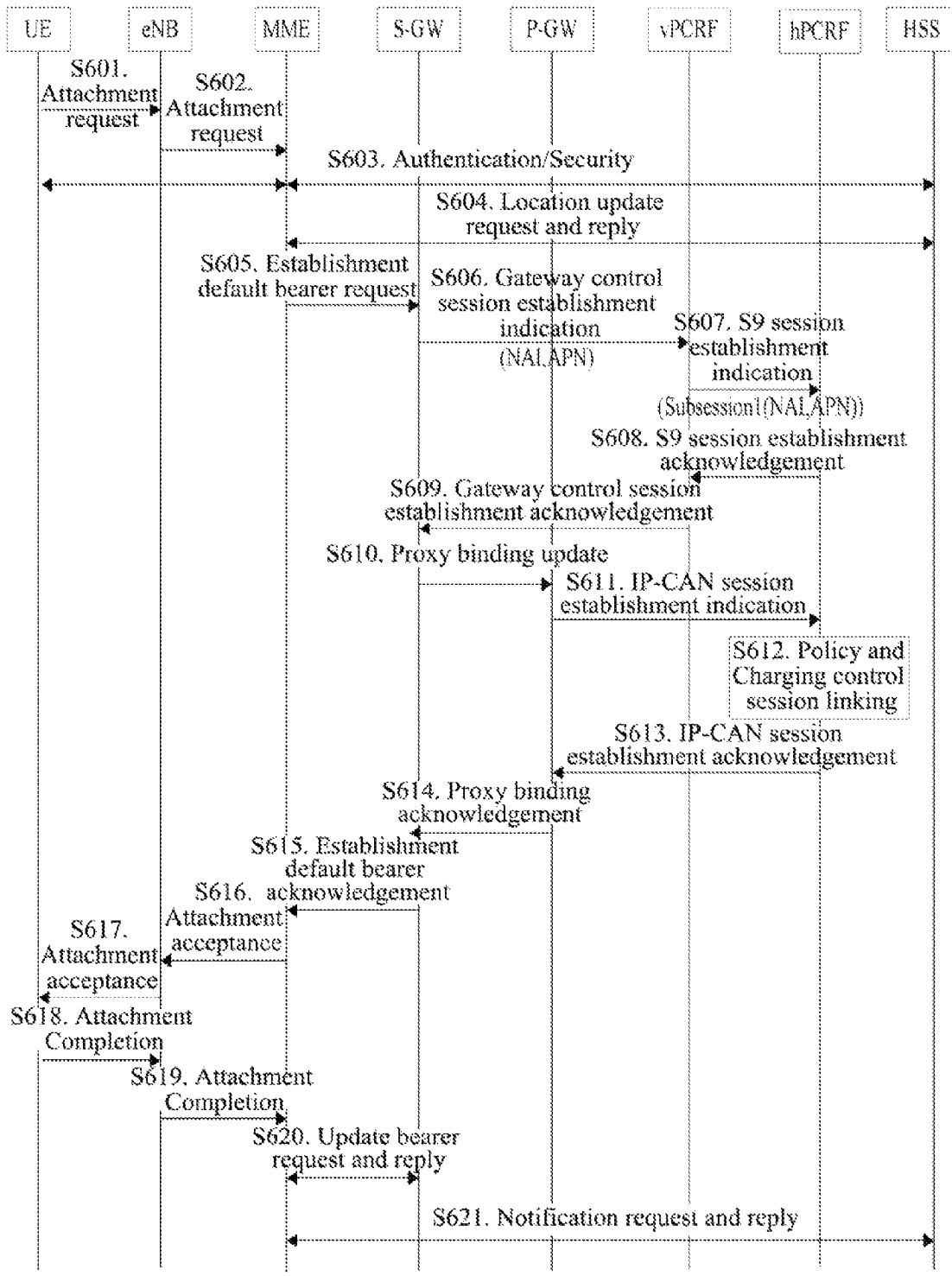
FIG. 6 is a flowchart showing that UE performs initial attachment through E-UTRAN in the home routed roaming scenario according to Embodiment 1 of this invention.

FIG. 6 is a flowchart showing that UE performs initial attachment through E-UTRAN in the home routed roaming scenario according to Embodiment 1 of this invention, wherein the PMIPv6 protocol is used between S-GW and P-GW. The procedure illustrated in FIG. 6 comprises the following steps.

Step S601: UE sends an attachment request message to eNodeB for requesting to access EPS.

Step S602: eNodeB sends an attachment request message to MME.

Step S603: the network authenticates UE and starts NAS security encryption protection.

Step S604: MME interacts with HSS and performs a location update procedure after UE passing authentication.

Step S605: MME selects a P-GW for UE according to a default APN subscribed by the user and selects S-GW, and MME sends an establishment default bearer request message to the selected S-GW.

Step S606: BBERF located at S-GW sends a gateway control session establishment indication message including a user identity NAI, a PDN identity APN and a bearer attribute of the current access network (including an EP-CAN type, a RAT type and a BBERF address) and so on to vPCRF; and the gateway control session (Gxx session) that the gateway control session establishment indication message requests to establish is represented as Gxx session1.

Step S607: vPCRF determines that a corresponding user is a roaming user and an S9 session is not established for the user yet according to the user identity NAI, and therefore vPCRF sends an S9 session establishment indication message to hPCRF for requesting to establish a subsession (Subsession1) of the S9 session, and vPCRF maintains a linking relationship between Gxx session1 and Subsession1 and includes the user identity NAI, PDN identity APN and bearer attribute of the current access network in Subsession1 to send to hPCRF.

Step S608: hPCRF obtains user subscription information according to the user identity NAI and PDN identity APN, and then makes policies according to the user subscription information, network policy and bearer attribute of the current access network, in which the policies made by hPCRF are a plurality of default policies including PCC rules, QoS rules and event triggers for the user accessing this APN at this time;

hPCRF returns an S9 session establishment acknowledgement message to vPCRF and includes QoS rules and event trigger in Subsesssion1 to send to vPCRF.

Step S609: vPCRF returns a gateway control session establishment acknowledgement message of Gxx session1 to BBERF, and sends QoS rules and event triggers in Subsession1 to BBERF; BBERF installs and enforces QoS rules and event triggers.

Step S610: S-GW sends a proxy binding update message including the user identity NAI, PDN identity APN and bearer attribute of the access network (including the IP-CAN type, or the IP-CAN type and the RAT type) to P-GW selected by MME in Step S605.

Step S611: P-GW allocates an IP address, represented as IP Address1, for a PDN connection (i.e., IP-CAN session) requested to establish for UE access; in a home routed scenario, P-GW is located at the home network, and PCEF located at P-GW sends an IP-CAN session establishment indication message including the user identity NAI, PDN identity APN, IP Address1 and bearer attribute of the access network and so on to hPCRF; the Gx session that the IP-CAN session establishment indication message requests to establish is represented as Gx session1.

Step S612: hPCRF links Gx session1 to Subsession1 in the S9 session according to the user identity NAI and PDN identity APN.

Step S613: hPCRF returns an IP-CAN session establishment acknowledgement message of Gx session 1 to PCEF and sends PCC rules and event triggers made in Step S608 to PCEF; the PCEF installs and enforces PCC rules and event triggers;

hPCRF may modify PCC rules and QoS rules according to the bearer attribute of the access network reported in Step S611, and at this time hPCRF will send the modified PCC rules and QoS rules respectively to PCEF and BBERF for update.

Step S614: P-GW returns a proxy binding acknowledgement message including IP Address1 to S-GW.

Step S615: S-GW returns an establishment default bearer reply message including IP Address1 to MME.

Step S616: MME returns an attachment acceptance message including IP Address1 to eNodeB.

Step S617: eNodeB returns an attachment acceptance message including IP Address1 to UE.

Step S618: UE sends an attachment completion message to eNodeB.

Step S619: eNodeB sends an attachment completion message to MME.

Step S620: MME performs an interaction procedure of updating the bearer with S-GW.

Step S621: MME obtains that UE can access non-3GPP according to user subscription information, and thus sends an address of P-GW selected for UE establishing a PDN connection to HSS; HSS returns a reply message after storing this P-GW address.

Figure 7A:
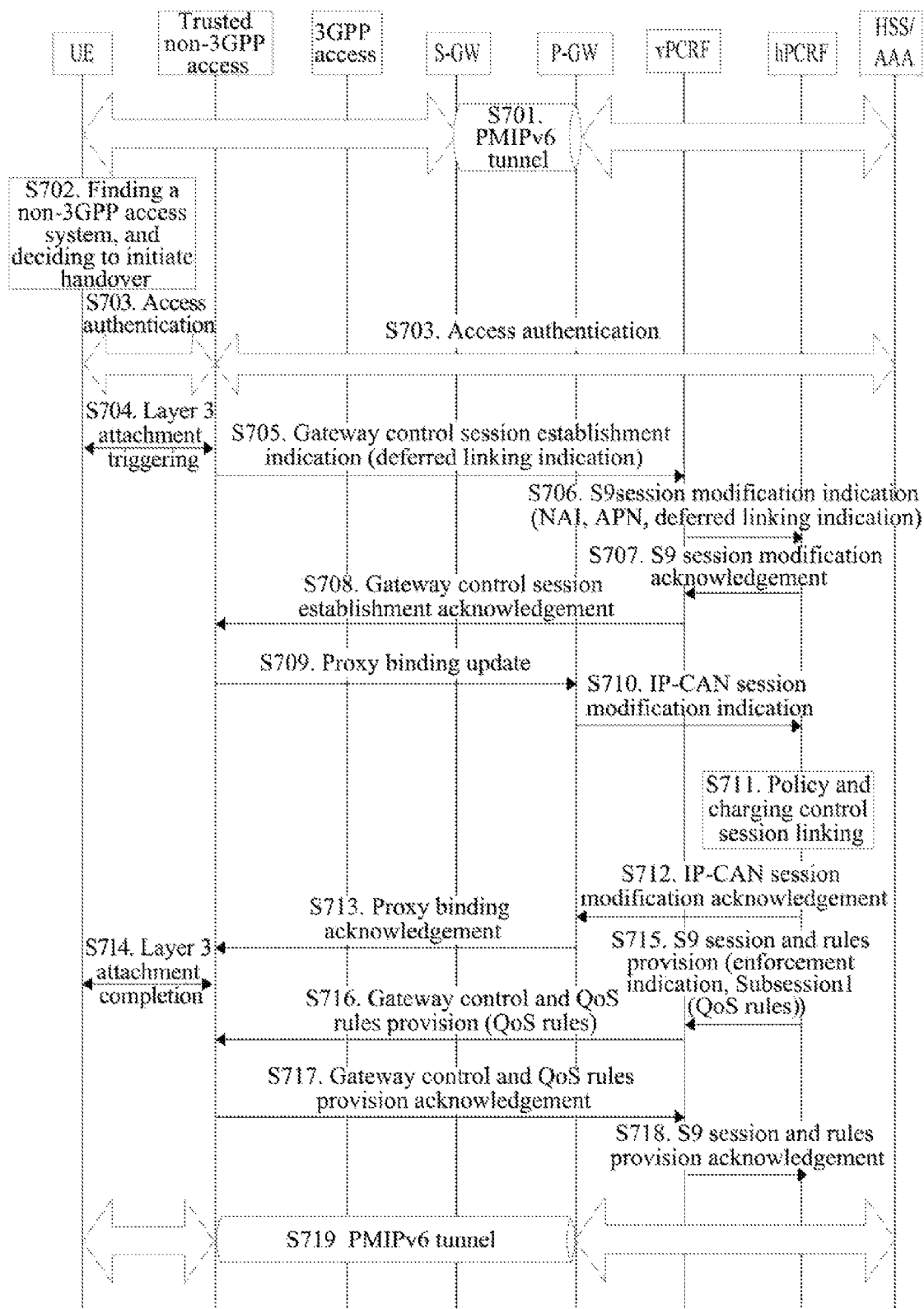
FIG. 7a is a flowchart showing handover of UE with the network mobility capacity from E-UTRAN access to trusted non-3GPP access after UE accessing EPS using the procedure illustrated in FIG. 6 according to Embodiment 1 of this invention.

FIG. 7a is a flowchart showing handover of UE from E-UTRAN access to trusted non-3GPP access after UE accessing EPS using the procedure illustrated in FIG. 6 according to Embodiment 1 of this invention, wherein the PMIPv6 protocol is used between the trusted non-3GPP access gateway and P-GW during non-3GPP access; in this procedure, UE has a network mobility capacity (i.e., IP address maintaining capacity). The procedure illustrated in FIG. 7a comprises the following steps.

Step S701: UE establishes a PDN connection through 3GPP access, wherein there is a PMIPv6 tunnel between S-GW and P-GW.

Step S702: UE finds a trusted non-3GPP access system and decides to perform handover on the current session from 3GPP access to this trusted non-3GPP access system.

Step S703: UE, the trusted non-3GPP access gateway and HSS/AAA perform an EAP authentication process in which HSS/AAA returns an address of P-GW selected for the UE during the 3GPP access to the trusted non-3GPP access gateway.

Step S704: a layer 3 attachment procedure specific to non-3GPP access is triggered after authentication is successful.

Step S705: as the trusted non-3GPP access gateway does not sure whether UE has the network mobility capacity (i.e., IP address maintaining capacity), BBERF located at the trusted non-3GPP access gateway sends a gateway control session establishment indication message including the user identity NAI, PDN identity APN, bearer attribute of the new access network (including the IP-CAN type, the RAT type and the BBERF address) and deferred linking indication to vPCRF; the gateway control session (Gxx session) that this gateway control session establishment indication message requests to establish is represented as Gxx session2.

Step S706: vPCRF links Gxx session2 to a subsession (Subsession1) of the S9 session established in the procedure illustrated in FIG. 6 according to the user identity NAI and PDN identity APN; vPCRF may also not link Gxx session 2 to a subsession (Subsession1) of the S9 session established in the procedure illustrated in FIG. 6 according to the deferred linking indication included in the gateway control session establishment indication message;

vPCRF finds a corresponding S9 session according the user identity NAI and PDN identity APN and sends an S9 session modification indication message to hPCRF; if vPCRF links Gxx session2 to Subsession1, vPCRF includes the bearer attribute of the new access network and deferred linking indication in Subsession1 to send to hPCRF; if vPCRF does not link Gxx session2 to Subsession1, vPCRF sends the bearer attribute of the new access network and deferred linking indication to hPCRF at S9 session level; the S9 session modification indication message may also include the user identity NAI and PDN identity APN.

Step S707: hPCRF relieves the linking relationship between Subsession1 and Gx session1 established in the procedure illustrated in FIG. 6 according to the deferred linking indication after receiving the S9 session modification indication message; hPCRF makes QoS rules and event triggers for UE during non-3GPP access according to user subscription information, network policies and bearer attributes of the new access network and so on, wherein these rules are default policies of the user excluding policies of dedicated service that the user previously accessed; hPCRF sends QoS rules, event triggers and a new BBERF address at an S9 session level (if linking is not perform in Step S706) or at a Subsession1 level (if linking is performed in Step S706) through an S9 session modification acknowledgement message to vPCRF.

Step S708: vPCRF determines that QoS rules and event triggers in this S9 session modification acknowledgement message are sent to BBERF in the trusted non-3GPP access gateway according a new BBERF address after receiving the S9 session modification acknowledgement message, and therefore vPCRF sends the above QoS rules and event triggers to BBERF in the trusted non-3GPP access gateway by a gateway control session establishment acknowledgement message of Gxx session2; BBERF installs and enforces QoS rules and event triggers; the trusted non-3GPP access gateway enforces a specific non-3GPP access procedure for resource reservation.

Step S709: the trusted non-3GPP access gateway sends a proxy binding update message including the user identity NAI, PDN identity APN and bearer attributes of the current access network (including an IP-CAN type, or an IP-CAN type and a RAT type) to a corresponding P-GW according to a P-GW address obtained in Step S703.

Step S710: if P-GW determines that UE has a network mobility capacity (i.e., IP address maintaining capacity), then the handover procedure of UE is enforced as follows:

P-GW allocates for UE the IP address (IP Address1) used during 3GPP access of UE to maintain the IP address unchanged, thereby ensuring continuity of services;

PCEF located at P-GW sends an IP-CAN session modification indication message including the bearer attribute of the new access network (including an IP-CAN type, or an IP-CAN type and an RAT type) to hPCRF; in addition, this IP-CAN session modification indication message may also include information such as the user identity NAI and PDN identity APN and so on; this IP-CAN session modification indication message modifies Gx session1 established in FIG. 6.

Step S711: hPCRF determines that UE can perform a handover procedure according to the IP-CAN session modification indication message sent by PCEF, and at this time re-links Subsession1 to Gx session1; the bearer attribute of the access network (including the IP-CAN type, or the IP-CAN type and the RAT type) included in this IP-CAN session modification indication message is consistent with the information reported in Step S706.

Step S712: hPCRF may modify PCC rules, QoS rules and event triggers of the PDN connection established before handover of UE according to the bearer attribute of the new access network; these rules include the policy of the dedicated service accessed by UE through 3GPP access; hPCRF returns the modified PCC rules and event triggers to PCEF for update through the IP-CAN session modification acknowledgement message of Gx session1.

Step S713: P-GW returns a proxy binding acknowledgement message including the IP Address1 to the trusted non-3GPP access gateway.

Step S714: the trusted non-3GPP access gateway returns a layer 3 attachment completion message including the IP Address1 to UE.

Step S715: hPCRF includes QoS rules and event triggers made in Step S712 in Subsession1 to send to vPCRF by an S9 session and rules provision message; Subsession1 also includes a new BBERF address at the same time for indicating that QoS rules and event trigger are sent to BBERF in the trusted non-3GPP access gateway; meanwhile, hPCRF will also send an enforcement indication to vPCRF to notify vPCRF to enforce a handover procedure;

if the system not sending the enforcement indication denotes to enforce a handover procedure by default, this S9 session and rules provision message may not include the enforcement indication.

Step S716: vPCRF acquires to enforce a handover procedure (according to the sent enforcement indication or not sending the enforcement indication denotes the handover by default), and if linking Gxx session2 established in Step S705 to Subsession1 is not performed in Step S706, vPCRF links Gxx session2 to Subsession1; vPCRF sends QoS rules and event triggers to BBERF in the trusted non-3GPP access gateway by a gateway control and QoS rules provision message of Gxx session2 according to the new BBERF address; and at this time vPCRF maintains a linking relationship among Gxx session 1, Gxx session 2 and Subsession1.

Step S717: BBERF in the trusted non-3GPP access gateway returns a gateway control and QoS rules provision acknowledgement message after installing QoS rules and event triggers; the trusted non-3GPP access gateway enforces a specific non-3GPP access procedure for resource reservation.

Step S718: vPCRF returns an S9 session and rules provision acknowledgement message to hPCRF.

Step S719: UE performs handover on the PDN connection from 3GPP access to trusted non-3GPP access, wherein there is a PMIPv6 tunnel (this PMIPv6 tunnel is established by Steps S709 and S713) between the trusted non-3GPP access gateway and P-GW; the services that UE accessed during 3GPP access can all be continuously accessed.

Figure 7B:
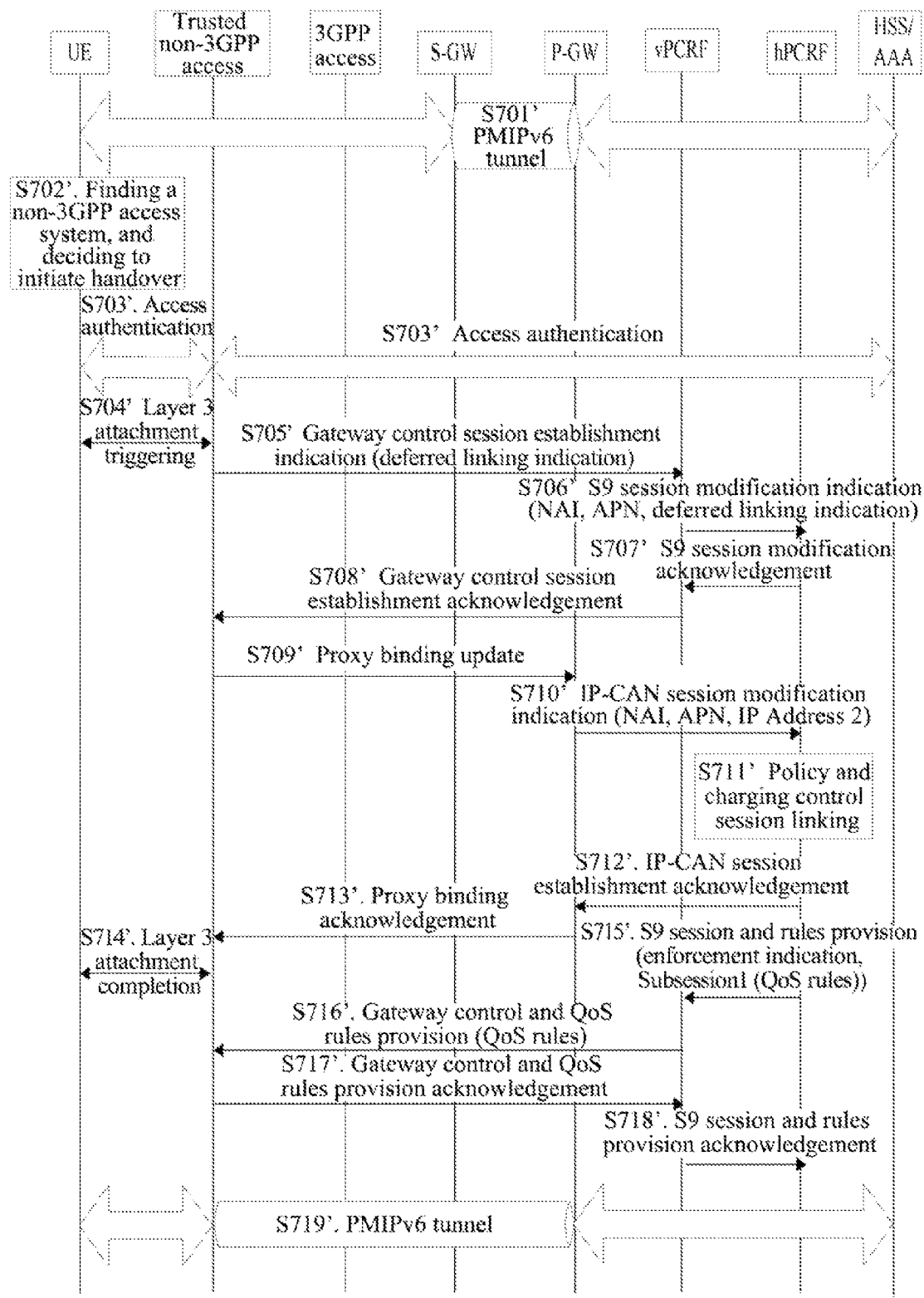
FIG. 7b is a flowchart showing handover of UE without the network mobility capacity from E-UTRAN access to trusted non-3GPP access after UE accessing EPS using the procedure illustrated in FIG. 6 according to Embodiment 1 of this invention.

In the above procedure, if P-GW determines that UE does not have the network mobility capacity, P-GW will establish a new PDN connection (i.e., IP-CAN session) for UE. The specific enforcement steps are as illustrated in FIG. 7b.

Steps S701' to S709' are the same as Steps S701 to S709.

Step S710': if P-GW determines that UE does not have a network mobility capacity (i.e., IP address maintaining capacity), P-GW decides to establish a new PDN connection;

P-GW allocates a new IP address (marked as IP Address 2) for UE;

PCEF located at P-GW sends an IP-CAN session establishment indication message including the user identity NAI, PDN identity APN, IP Address2 and bearer attribute of the new access network (including an IP-CAN type, or an IP-CAN type and a RAT type) to hPCRF; the IP-CAN session establishment indication message requests to establish a new Gx session which is represented as Gx session 2.

Step S711': hPCRF determines that UE cannot perform a handover procedure but newly establishes a PDN connection in the trusted non-3GPP access gateway according an IP-CAN session establishment indication message sent by PCEF, and therefore links Subsession1 to Gx session2 according to the user identity NAI and PDN identity APN.

Step S712': hPCRF makes default policies (including PCC rules, QoS rules and event triggers) for the newly established PDN connection (i.e., IP-CAN session) according bearer attributes of the new access network, network policies and user subscription information and so on, and returns PCC rules and event triggers to PCEF through an IP-CAN session establishment acknowledgement message of Gx session2, and PCEF installs and enforces PCC rules and event trigger.

Step S713': P-GW returns a proxy binding acknowledgement message including the IP Address1 to the trusted non-3GPP access gateway.

Step S714': the trusted non-3GPP access gateway returns a layer 3 attachment completion message including the IP Address1 to UE.

Step S715': hPCRF sends an S9 session and rules provision message of Subsession1 including an enforcement indication for notifying the vPCRF to enforce a procedure of newly establishing a PDN connection to vPCRF; if QoS rules and event triggers made in Step S712' are different from that made in Step S707', hPCRF includes QoS rules and event triggers made in Step S712' in Susession1 to send to vPCRF.

Step S716': after receiving the S9 session and rules provision message, if linking Gxx session2 established in Step S705' to Subsession1 is not performed in Step S706, vPCRF links Gxx session2 to Subsession1 at this time; vPCRF relieves the linking relationship between Gxx session1 and Subsession1 according to an enforcement indication; vPCRF sends QoS rules to BBERF in the trusted non-3GPP access gateway through a gateway control and QoS rules provision message of Gxx session 2.

Step S717': BBERF in the trusted non-3GPP access gateway installs and enforces QoS rules and event triggers, and returns a gateway control and QoS rules provision acknowledgement message to vPCRF; the trusted non-3GPP access gateway enforces a specific non-3GPP access procedure for resource reservation;

Step S718': vPCRF returns an S9 session and rules provision acknowledgement message to hPCRF.

Step S719': UE newly establishes a PDN connection (i.e., IP-CAN session) through the trusted non-3GPP access network, wherein there is a PMIPv6 tunnel (this PMIPv6 tunnel is established by Steps S709' and S713') between the trusted non-3GPP access gateway and P-GW; the services that UE accessed during 3GPP access cannot be continuously accessed, and UE needs to reinitiate a service access request.

This embodiment is also applicable to handover of UE from one trusted non-3GPP access network to another trusted non-3GPP access network, wherein the PMIPv6 protocol is used between the trusted non-3GPP access gateway and P-GW when accessing two non-3GPP access networks.

Second Embodiment (Local Breakout)

Figure 8:
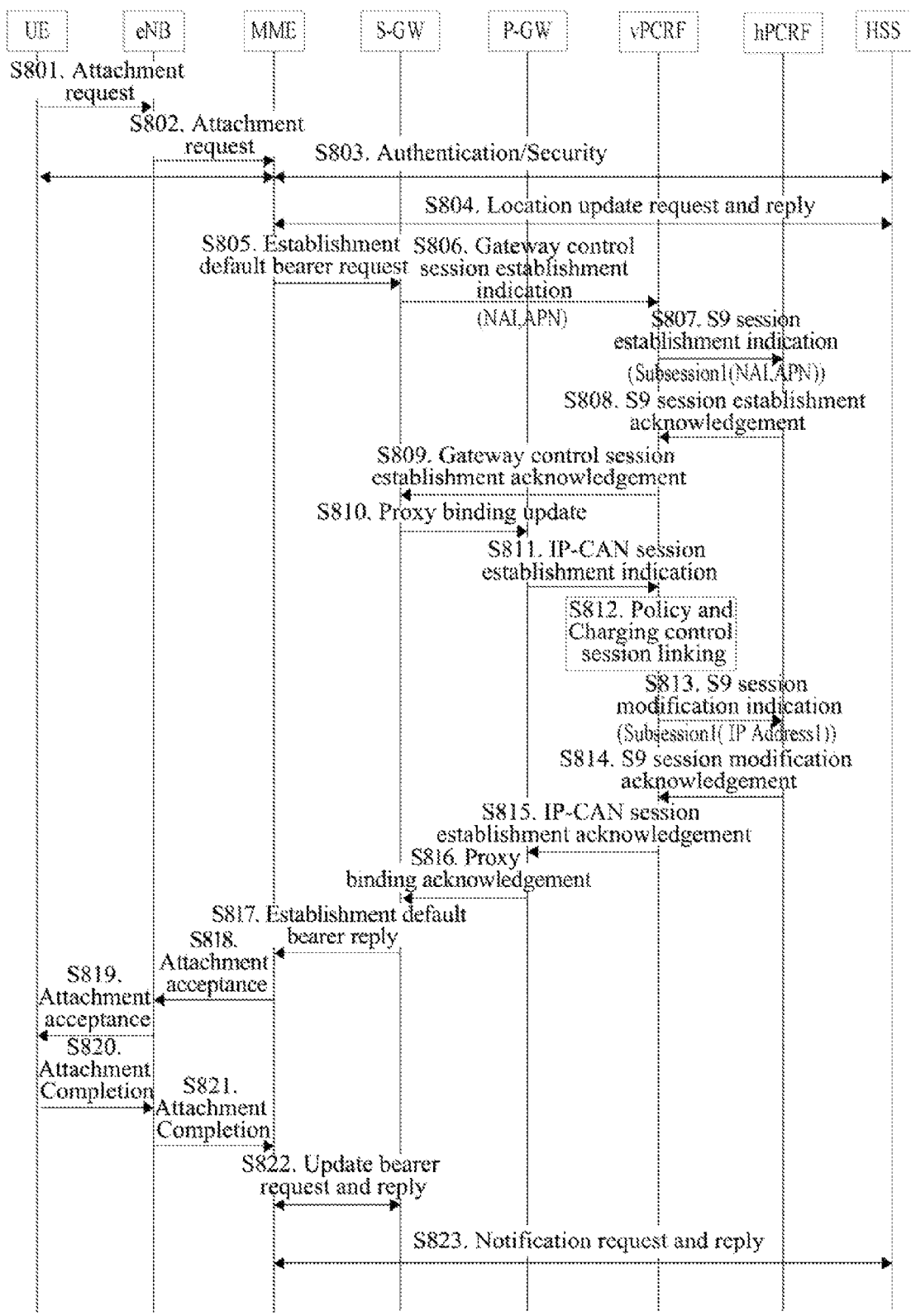
FIG. 8 is a flowchart showing that UE performs initial attachment through E-UTRAN in the local breakout roaming scenario according to Embodiment 2 of this invention.

FIG. 8 is a flowchart showing that UE performs initial attachment through E-UTRAN in the local breakout roaming scenario according to Embodiment 2 of this invention, wherein the PMIPv6 protocol is used between S-GW and P-GW. The procedure illustrated in FIG. 8 comprises the following steps.

Step S801: UE sends an attachment request message to eNodeB for requesting to access EPS.

Step S802: eNodeB sends an attachment request message to MME.

Step S803: the network authenticates UE and initiates NAS security encryption protection.

Step S804: MME interacts with HSS and performs a location update procedure after UE passing authentication.

Step S805: MME selects P-GW for UE according to a default APN subscribed by the user and selects S-GW, and MME sends an establishment default bearer request message to the selected S-GW.

Step S806: BBERF located at S-GW sends a gateway control session establishment indication message including a user identity NAI, a PDN identity APN and a bearer attribute of the current access network (including an IP-CAN type, a RAT type and a BBERF address) and so on to vPCRF; and the gateway control session (Gxx session) that the gateway control session establishment indication message requests to establish is represented as Gxx session1.

Step S807: vPCRF determines that a corresponding user is a roaming user and an S9 session is not established for the user yet according to the user identity NAI, and therefore vPCRF sends an S9 session establishment indication message to hPCRF for requesting to establish a subsession (Subsession1) of the S9 session, and vPCRF maintains a linking relationship between Gxx session1 and Subsession1 and includes NAI, APN and the bearer attribute of the current access network in Subsession1 to send to hPCRF.

Step S808: hPCRF obtains user subscription information according to the user identity NAI and PDN identity APN, and then makes policies according to the user subscription information, network policy and bearer attribute of the current access network, in which the policies made by hPCRF are a plurality of default policies including PCC rules, QoS rules and event triggers for the user accessing this APN at this time;

hPCRF returns an S9 session establishment acknowledgement message to vPCRF and includes QoS rules and event triggers in Subsession1 to send to vPCRF.

Step S809: vPCRF returns a gateway control session establishment acknowledgement message of Gxx session1 to BBERF, and sends QoS rules and event triggers in Subsession1 to BBERF; the BBERF installs and enforces QoS rules and event triggers.

Step S810: S-GW sends a proxy binding update message including the user identity NAI, PDN identity APN and bearer attribute of the access network (including the IP-CAN type, or the IP-CAN type and the RAT type) to P-GW selected by MME in Step S805.

Step S811: P-GW allocates an IP address, represented as IP Address1, for a PDN connection (i.e., IP-CAN session) requested to establish for UE access; PCEF located at P-GW sends an IP-CAN session establishment indication message including the user identity NAI, PDN identity APN, IP Address1 and bearer attribute of the access network (including the IP-CAN type, or the IP-CAN type and the RAT type) and so on to vPCRF; the Gx session that the IP-CAN session establishment indication message requests to establish is represented as Gx session1.

Step S812: vPCRF links Gx session1 to Gxx session1 and Subssesion1 in the S9 session according to NAI and APN.

Step S813: vPCRF sends an S9 session modification indication message to hPCRF and includes IP Address1 in Subsession1 to send to hPCRF.

Step S814: hPCRF sends an S9 session modification acknowledgement message to vPCRF and includes PCC rules and event triggers made in Step S808 in Subssesion1 to send to vPCRF;

hPCRF may modify PCC rules, QoS rules and event triggers, and at this time hPCRF will respectively send the modified PCC rules and QoS rules to PCEF and BBERF for update.

Step S815: vPCRF sends an IP-CAN session establishment acknowledgement message of Gx session 1 to PCEF, and sends PCC rules and event triggers to PCEF; the PCEF installs and enforces PCC rules and event triggers.

Step S816: P-GW sends a proxy binding acknowledgement message including IP Address1 to S-GW.

Step S817: S-GW returns an establishment default bearer reply message including IP Address1 to MME.

Step S818: MME returns an attachment acceptance message including IP Address1 to eNodeB.

Step S819: eNodeB returns an attachment acceptance message including IP Address1 to UE.

Step S820: UE sends an attachment completion message to eNodeB.

Step S821: eNodeB sends an attachment completion message to MME.

Step S822: MME performs an interaction procedure of updating the bearer with S-GW.

Step S823: MME obtains that UE can access non-3GPP according to user subscription information, and thus sends an address of P-GW selected for UE establishing a PDN connection to HSS; HSS returns a reply message after storing this P-GW address.

Figure 9A:
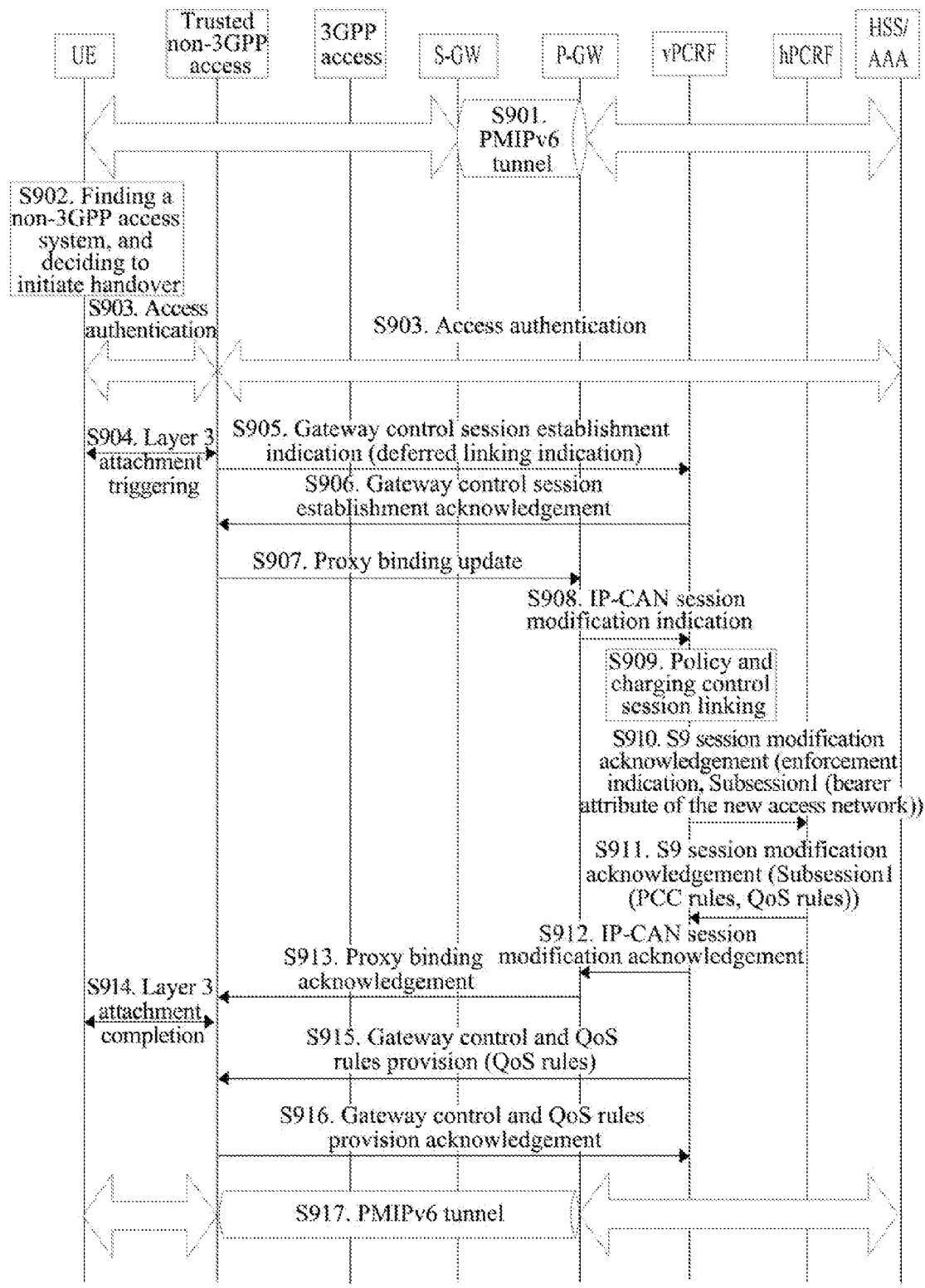
FIG. 9a is a flowchart showing handover of UE with the network mobility capacity from E-UTRAN access to trusted non-3GPP access after UE accessing EPS using the procedure illustrated in FIG. 8 according to Embodiment 2 of this invention.

FIG. 9a is a flowchart showing handover of UE from E-UTRAN access to trusted non-3GPP access after UE accessing EPS using the procedure illustrated in FIG. 8 according to Embodiment 2 of this invention, wherein the PMIPv6 protocol is used between the trusted non-3GPP access gateway and P-GW through non-3GPP access; in this procedure, UE has a network mobility capacity (i.e., IP address maintaining capacity). The procedure illustrated in FIG. 9a comprises the following steps.

Step S901: UE establishes a PDN connection through 3GPP access, wherein there is a PMIPv6 tunnel between S-GW and P-GW.

Step S902: UE finds a trusted non-3GPP access system and decides to perform handover on the current session from 3GPP access to this trusted non-3GPP access system.

Step S903: UE, the trusted non-3GPP access gateway and HSS/AAA perform an EAP authentication process in which HSS/AAA returns an address of P-GW selected for the UE during the 3GPP access to the trusted non-3GPP access gateway.

Step S904: a layer 3 attachment procedure specific to non-3GPP access is triggered after authentication is successful.

Step S905: as the trusted non-3GPP access gateway does not sure whether UE has the network mobility capacity (i.e., IP address maintaining capacity), BBERF located at the trusted non-3GPP access gateway sends a gateway control session establishment indication message including the user identity NAI, PDN identity APN, bearer attribute of the new access network (including the IP-CAN type, the RAT type and the BBERF address) and deferred linking indication to vPCRF; the gateway control session (Gxx session) that this gateway control session establishment indication message requests to establish is represented as Gxx session2.

Step S906: vPCRF links Gxx session2 to Subsession1 according to NAI and APN; vPCRF may also not link Gxx session2 to any subsession of the S9 session according to the deferred linking indication included in the gateway control session establishment indication message; vPCRF relieves the linking relationship between Subsession1 and Gx session 1 according to the deferred linking indication; as the roaming way of UE is local breakout, vPCRF searches default QoS rules and event triggers sent by hPCRF in the procedure of FIG. 8 according to NAI and APN, correspondingly modifies default QoS rules and event triggers sent by hPCRF in FIG. 8 according to the bearer attribute of the new access network, and includes the modified QoS rules and event triggers in the gateway control session establishment acknowledgement message of Gxx session2 to send to BBERF in the trusted non-3GPP access gateway; BBERF installs and enforces QoS rules and event trigger; the trusted non-3GPP access gateway enforces a specific non-3GPP access procedure for resource reservation.

Step S907: the trusted non-3GPP access gateway sends a proxy binding update message including the user identity NAI, PDN identity APN and bearer attributes of the current access network (including an IP-CAN type, or an IP-CAN type and a RAT type) to a corresponding P-GW according to a P-GW address obtained in Step S903.

Step S908: if P-GW determines that UE has a network mobility capacity (i.e., IP address maintaining capacity), then the P-GW enforces the handover procedure as follows:

P-GW allocates for UE the IP address (IP Address1) used during the 3GPP access of UE to maintain the IP address unchanged, thereby ensuring continuity of services;

PCEF located at P-GW sends an IP-CAN session modification indication message including the bearer attribute of the new access network (including an IP-CAN type, or an IP-CAN type and an RAT type) to vPCRF; this IP-CAN session modification indication message modifies Gx session1 established in FIG. 8.

Step S909: vPCRF determines that UE can perform a handover procedure according to the received IP-CAN session modification indication message, vPCRF links Gxx session2 established in Step S905 to Gx session1 according to the user identity NAI and PDN identity APN, and meanwhile maintains the linking relationship between Gxx session1 and Gx session1; if Step S906 does not links Gxx session2 to a subsession of the S9 session, vPCRF links Gxx session2 to Subsession1 at this time.

Step S910: vPCRF sends an S9 session modification indication message including Subsession1 to hPCRF, wherein the vPCRF includes the bearer attribute of the new access network (the IP-CAN type, RAT type and BBERF address) in Subsession1 to send to hPCRF; this S9 session modification indication message also includes an enforcement indication for notifying hPCRF to enforce a handover procedure;

if the system not sending the enforcement indication denotes to enforce a handover procedure by default, this message may not includes the enforcement indication.

Step S911: hPCRF acquires to enforce a handover procedure (according to the sent enforcement indication or not sending the enforcement indication denotes the handover by default), and therefore modifies PCC rules, QoS rules and event triggers of the PDN connection established before handover of UE according to a bearer attribute of the new access network, wherein these policies include the policies of the dedicated service accessed by the user during the 3GPP access; hPCRF includes the modified PCC rules, QoS rules and event triggers in Subsession1 to send to vPCRF by an S9 session modification acknowledgement message, Subsession1 also includes a new BBERF address for indicating that QoS rules and event triggers are sent to BBERF in the trusted non-3GPP access gateway.

Step S912: vPCRF sends PCC rules and event triggers to PCEF through an IP-CAN session modification acknowledgement message of Gx session1, and PCEF updates PCC rules and event trigger.

Step S913: P-GW returns a proxy binding acknowledgement message including the IP Address1 to the trusted non-3GPP access network.

Step S914: the trusted non-3GPP access gateway returns a layer 3 attachment completion message including the IP Address1 to UE.

Step S915: vPCRF sends QoS rules and event trigger to BBERF in the trusted non-3GPP access gateway by a gateway control and QoS rules provision message of Gxx session2 according to a new BBERF address.

Step S916: BBERF in the trusted non-3GPP access gateway installs and enforces QoS rules and event triggers, and returns a gateway control and QoS rules provision acknowledgement message to vPCRF; the trusted non-3GPP access gateway enforces a specific non-3GPP access procedure for resource reservation.

Step S917: UE performs handover on the PDN connection from 3GPP access to trusted non-3GPP access, wherein there is a PMIPv6 tunnel (this PMIPv6 tunnel is established by Steps S907 and S913) between the trusted non-3GPP access gateway and P-GW; the dedicated services that UE accessed during 3GPP access can all be continuously accessed.

In other embodiments of this invention, hPCRF only makes/modifies PCC rules without making/modifying QoS rules. In this case, vPCRF makes corresponding QoS rules according to PCC rules sent by hPCRF and sends the QoS rules to corresponding BBERF. For example, hPCRF makes PCC rules for a PDN connection established by UE through trusted non-3GPP access and sends the PCC rules to vPCRF, and vPCRF makes QoS rules according to PCC rules and sends the QoS rules to BBERF in the trusted non-3GPP access gateway.

Figure 9B:
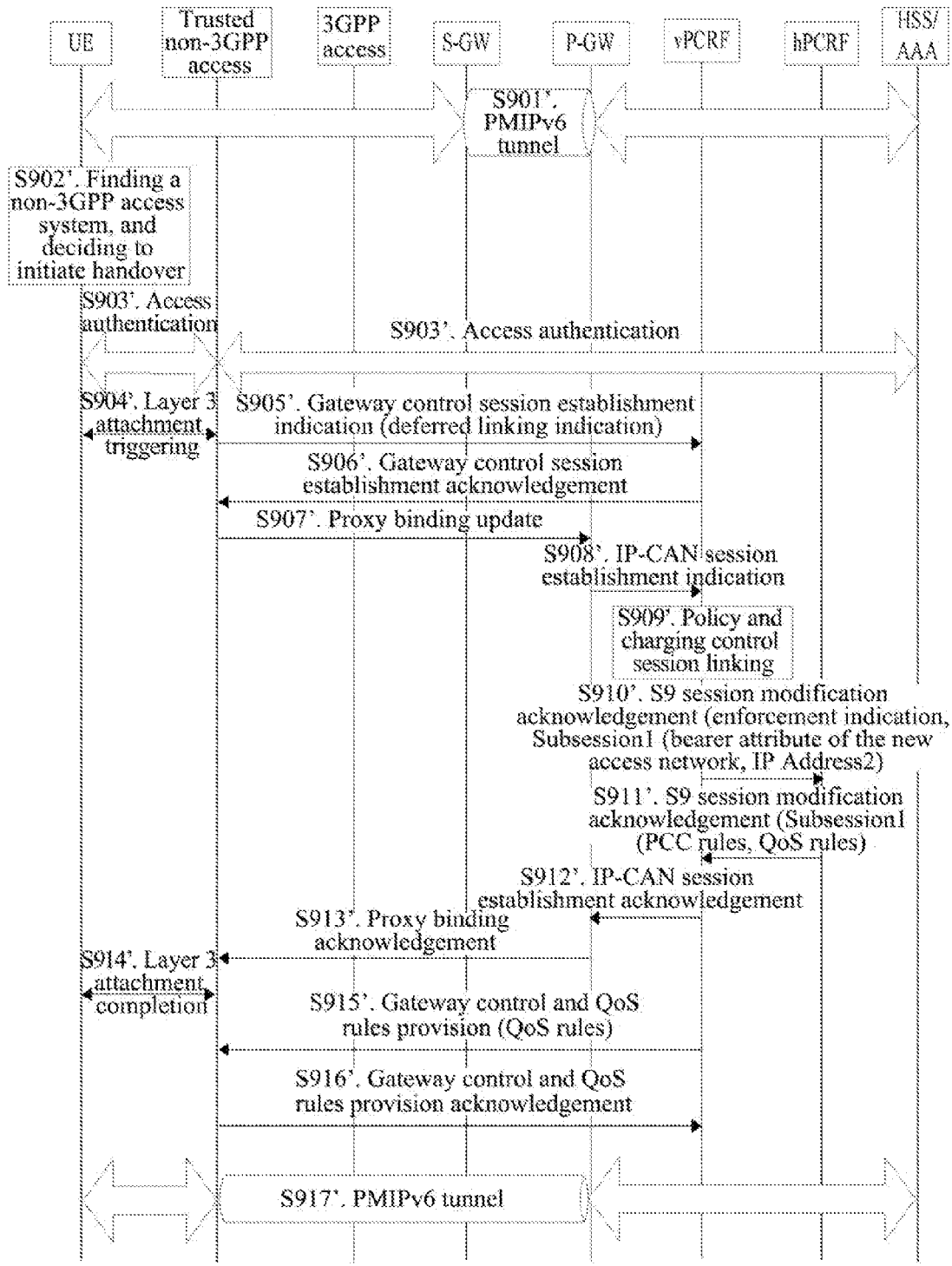
FIG. 9b is a flowchart showing handover of UE without the network mobility capacity from E-UTRAN access to trusted non-3GPP access after UE accessing EPS using the procedure illustrated in FIG. 8 according to Embodiment 2 of this invention.

In the above procedure, if P-GW determines that UE does not have a network mobility capacity, P-GW will establish a new PDN connection (i.e., IP-CAN session) for UE. The specific enforcement steps are as illustrated in FIG. 9*b*.

Steps S901' to S907' are the same as Steps S901 to S907.

Step S908': if P-GW determines that UE does not have a network mobility capacity (i.e., IP address maintaining capacity), P-GW decides to establish a new PDN connection;

P-GW allocates a new IP address (marked as IP Address2) for UE;

PCEF located at P-GW sends an IP-CAN session establishment indication message including the user identity NAI, PDN identity APN, IP Address2 and bearer attribute of the new access network (including an IP-CAN type, or an IP-CAN type and a RAT type) to hPCRF; the IP-CAN session establishment indication message requests to establish a new Gx session which is represented as Gx session 2.

Step S909': vPCRF determines that UE cannot perform a handover procedure according to the received IP-CAN session modification indication message but newly establishes a PDN connection, vPCRF links Gxx session2 to Gx session2 according to the user identity NAI and PDN identity APN, and relieves the linking relationship among the Subsession1, Gxx session1 and Gx session1; if Step S906' does not links Gxx session2 to a subsession of the S9 session, vPCRF links Gxx session2 to Subsession1 at this time.

Step S910': vPCRF sends an S9 session modification indication message to hPCRF, wherein the vPCRF includes the bearer attribute of the new access network and IP Address2 in Subsession1 to send to hPCRF; this S9 session modification indication message also includes an enforcement indication for notifying hPCRF to enforce a procedure of newly establishing a PDN connection (i.e., IP-CAN session).

Step S911': hPCRF determines that UE initiates establishment of a new PDN connection (i.e., IP-CAN session) according to an enforcement indication and therefore hPCRF makes PCC rules, QoS rules and event triggers for the newly established PDN connection (i.e., IP-CAN session) according to a bearer attribute of the new access network, network policies and user subscription information and so on, wherein these policies are all default policy excluding the policies of the dedicated service accessed by the user during the 3GPP access; hPCRF includes the above PCC rules, QoS rules and event triggers in Subsession1 to send to vPCRF by an S9 session modification acknowledgement message.

Step S912': vPCRF sends PCC rules and event triggers to PCEF by an IP-CAN session establishment acknowledgement message of Gx session2, and PCEF installs and enforces PCC rules and event triggers.

Step S913': P-GW returns a proxy binding acknowledgement message including the IP Address2 to the trusted non-3GPP access gateway.

Step S914': the trusted non-3GPP access gateway returns a layer 3 attachment completion message including the IP Address2 to UE.

Step S915': vPCRF sends QoS rules and event triggers to BBERF in the trusted non-3GPP access gateway by a gateway control and QoS rules provision message of Gxx session 2.

Step S916': BBERF in the trusted non-3GPP access gateway installs and enforces QoS rules and event triggers, and returns a gateway control and QoS rules provision acknowledgement message to vPCRF; the trusted non-3GPP access gateway enforces a specific non-3GPP access procedure for resource reservation.

Step S917': UE newly establishes a PDN connection (i.e., IP-CAN session) through the trusted non-3GPP access network, wherein there is a PMIPv6 tunnel (this PMIPv6 tunnel is established by Steps S709' and S713') between the trusted non-3GPP access gateway and P-GW; the services that UE accessed during 3GPP access cannot be continuously accessed, and UE needs to reinitiate a service access request.

This embodiment is also applicable to handover of UE from one trusted non-3GPP access network to another trusted non-3GPP access network, wherein the PMIPv6 protocol is used between the trusted non-3GPP access gateway and P-GW when accessing two non-3GPP access networks.

In other embodiments of this invention, hPCRF only makes PCC rules without making QoS rules. In this case, vPCRF makes corresponding QoS rules according to PCC rules sent by hPCRF and sends the QoS rules to corresponding BBERF. For example, hPCRF makes PCC rules for a PDN connection (i.e., IP-CAN session) established by UE through trusted non-3GPP access and sends the PCC rules to vPCRF, and vPCRF makes QoS rules according to PCC rules and sends the QoS rules to BBERF in the trusted non-3GPP access gateway.

Based on the above method, the present invention further provides a system for a Bearer Binding and Event Report Function (BBERF) relocation, and the system comprises: a visited Policy and Charging Rule Function (PCRF), a home PCRF and a Policy and Charging Execution Function (PCEF), wherein after establishing a first IP Connectivity Access Network (IP-CAN) session for a User Equipment (UE) in an Evolved Packet System (EPS) and establishing a first gateway control session, a first Gx session, an S9 session and a first subsession of the S9 session that are used to perform policy control to the first IP-CAN session, and in a process of the BBERF relocation:

the PCEF is configured to: send an IP-CAN session modification indication message or an IP-CAN session establishment indication message to the visited PCRF;

the BBERF is configured to: establish a second gateway control session between a destination BBERF and a visited Policy and Charging Rules Function (PCRF) when the BBERF is the destination BBERF;

the visited PCRF is configured to: link said first Gx session that said IP-CAN session modification indication message requests to modify to said second gateway control session and said first subsession according to session identity information; or link a second Gx session that said IP-CAN session establishment indication message requests to establish to said second gateway control session and said first subsession according to session identity information.

the home PCRF is configured to: newly make a policy for a user and provide the policy to said visited PCRF through said first subsession.

In the above system, said visited PCRF is further configured to: obtain a policy, modified by the home PCRF for the user, through said first subsession after linking said first Gx session to said second gateway control session and said first subsession, and send a Policy and Charging Control (PCC) rule in said policy to said PCEF by said first Gx session and send a Quality of Service (QoS) rule in said policy to said destination BBERF by said second gateway control session;

or said visited PCRF is further configured to: obtain a default policy, newly made by said home PCRF for the user, through said first subsession after linking said second Gx session to said second gateway control session and said first subsession, and send a PCC rule in said default policy to said PCEF by said second Gx session and send a QoS rule in said default policy to said destination BBERF by said second gateway control session.

In the above system, said visited PCRF is further configured to: obtain a policy, modified by the home PCRF for the user, through said first subsession after linking said first Gx session to said second gateway control session and said first subsession, and send a Policy and Charging Control (PCC) rule in said policy to said PCEF by said first Gx session, and make a corresponding Quality of Service (QoS) rule according to said PCC rule and then send said QoS rule to said destination BBERF by said second gateway control session;

or said visited PCRF is configured to: obtain a default policy, newly made by said home PCRF for the user, through said first subsession after linking said second Gx session to said second gateway control session and said first subsession, and send a PCC rule in said default policy to said PCEF by said second Gx session, and make a corresponding QoS rule according to said PCC rule and then send said QoS rule to said destination BBERF by said second gateway control session.

In the above system, said visited PCRF is configured to obtain the policy modified by said home PCRF for the user in a following way: said visited PCRF sending an S9 session modification indication message including an enforcement indication, for indicating said home PCRF to modify said policy for the user, to said home PCRF; and receiving an S9 session modification acknowledgement message including said policy modified for the user sent form said home PCRF; and said home PCRF is further configured to: include said policy modified for the user in the S9 session modification acknowledgement message after receiving said S9 session modification indication message to send to said visited PCRF according to said enforcement indication;

or said visited PCRF is configured to obtain the policy modified by said home PCRF for the user in a following way: sending an S9 session modification indication message including an enforcement indication, for indicating said home PCRF to make said default policy for the user, to said home PCRF; and receiving an S9 session modification acknowledgement message including said default policy made by said home PCRF; and said home PCRF is further configured to: include said default policy made by said home PCRF for the user in the S9 session modification acknowledgement message to send to said visited PCRF according to said enforcement indication.

In the above system, the BBERF is configured to establish a second gateway control session between the destination BBERF and the visited PCRF when the BBERF is the destination BBERF in a following way: said destination BBERF sending a gateway control session establishment indication message including an deferred linking indication, a bearer attribute of an access network and session identity information to said visited PCRF; and receiving a Quality of Service (QoS rule through a gateway control session establishment acknowledgement message;

said is further configured to: searching a default QoS rule corresponding to said session identity information according to said deferred liking indication, modify said default QoS rule according to said bearer attribute of the access network, and then send the QoS rule to said destination BBERF.

In the above system, said session identity information includes a user identity and a packet data network identity.

Based on the above method, the present invention further provides a policy and charging rule function (PCRF), which comprises a visited PCRF, wherein in a process of a Bearer Binding and Event Report Function (BBERF) relocation after establishing a first Internet Protocol (IP) Connectivity Access Network (IP-CAN) session for User Equipment (UE) and establishing a first gateway control session, a first Gx session, an S9 session and a first subsession of the S9 session which are used to perform policy control to said first IP-CAN session in an Evolved Packet System (EPS), the visited PCRF is configured to:

establish a second gateway control session with a destination BBERF; and receive an IP-CAN session modification indication message sent by a Policy and Charging Enforcement Function (PCEF), and link said first Gx session that said IP-CAN session modification indication message requests to modify to said second gateway control session and said first subsession according to session identity information; or receive an IP-CAN session establishment indication message sent by said PCEF, and link a second Gx session that said IP-CAN session establishment indication message requests to establish to said second gateway control session and said first subsession according to session identity information.

In the above PCRF, the visited PCRF is further configured to:

obtain a policy, modified by a home PCRF for a user through said first subsession after linking said first Gx session to said second gateway control session and said first subsession, and send a Policy and Charging Control (PCC) rule in said policy to said PCEF by said first Gx session and send a Quality of Service (QoS) rule in said policy to said destination BBERF by said second gateway control session;

or obtain a default policy, newly made by said home PCRF for the user, through said first subsession after linking said second Gx session to said second gateway control session and said first subsession, and send a PCC rule in said default policy to said PCEF by said second Gx session and send a QoS rule in said default policy to said destination BBERF by said second gateway control session.

In the above PCRF, the visited PCRF is further configured to:

obtain a policy, modified by a home PCRF for a user through said first subsession after linking said first Gx session to said second gateway control session and said first subsession, and send a Policy and Charging Control (PCC) rule in said policy to said PCEF by said first Gx session, and make a corresponding Quality of Service (QoS) rule according to said PCC rule and then send said QoS rule to said destination BBERF by said second gateway control session;

or obtain a default policy, newly made by said home PCRF for the user, through said first subsession after linking said second Gx session to said second gateway control session and said first subsession, and send a PCC rule in said default policy to said PCEF by said second Gx session, and make a corresponding QoS rule according to said PCC rule and sending said QoS rule to said destination BBERF by said second gateway control session.

In the above PCRF, said visited PCRF is configured to obtain the policy modified by said home PCRF for the user in a following way:

said visited PCRF sending an S9 session modification indication message including an enforcement indication, for indicating, said home PCRF to modify said policy for the user, to said home PCRF; and receiving an S9 session modification acknowledgement message including said policy modified for the user sent by said home PCRF;

or said visited PCRF sending an S9 session modification indication message including an enforcement indication, for indicating said home PCRF to make said default policy for the user, to said home PCRF; and receiving an S9 session modification acknowledgement message including said default policy made by said home PCRF for the user sent from said home PCRF.

In the above PCRF, said visited PCRF is configured to establish the second gateway control session with the destination BBERF in a following way:

receiving a gateway control session establishment indication message including an deferred linking indication, a bearer attribute of an access network and session identity information sent from said destination BBERF; and after receiving said gateway control session establishment indication message, said visited PCRF searching a default Quality of Service (QoS) rule corresponding to said session identity information according to said deferred liking indication, modifying said default QoS rule according to said bearer attribute of the access network, and then sending the QoS rule to said destination BBERF through a gateway control session establishment acknowledgement message.

In the above system, said session identity information includes a user identity and a packet data network identity.

Industrial Applicability

The invention links a subsession of the S9 session established before handover of UE to a gateway control session established between a destination BBERF and vPCRF and a corresponding Gx session according to session identity information (including the user identity, and PDN identity and so on) in the process of BBERF relocation, thereby achieving deferred linking of policy and charging control sessions in roaming scenarios of the home routed and local breakout.

What is claimed is:

1. A method for a Bearer Binding and Event Report Function (BBERF) relocation in a home routed roaming scenario, which is used in a process of the BBERF relocation after establishing a first Internet Protocol (IP) Connectivity Access Network (IP-CAN) session for a User Equipment (UE) and establishing a first gateway control session, a first Gx session, an S9 session and a first subsession of the S9 session which are used to perform policy control to said first IP-CAN session in an Evolved Packet System (EPS), said method comprising:

establishing a second gateway control session between a destination BBERF and a visited Policy and Charging Rules Function (PCRF);

if an IP-CAN session modification indication message sent by a Policy and Charging Enforcement Function (PCEF) is received, a home PCRF linking said first Gx session that said IP-CAN session modification indication message requests to modify to said first subsession according to session identity information; or, if an IP-CAN session establishment indication message sent by said PCEF is received, said home PCRF linking a second Gx session, that said IP-CAN session establishment indication message requests to establish, for performing policy control to a second IP-CAN session to said first subsession according to session identity information; and said visited PCRF linking said second gateway control session to said first subsession after the establishment of the second gateway control session.

2. The method according to claim 1, wherein the step of establishing the second gateway control session between the destination BBERF and the visited PCRF comprises:

said destination BBERF sending a gateway control session establishment indication message to said visited PCRF;

after receiving said gateway control session establishment indication message, said visited PCRF including a deferred linking indication, session identity information and a bearer attribute of an access network, which are included in said gateway control session establishment indication message, in an S9 session modification indication message of said S9 session to send to the home PCRF;

after receiving said S9 session modification indication message, said home PCRF making a default Quality of Service (QoS) rule for a user according to said deferred linking indication, said session identity information and said bearer attribute of the access network, and including said default QoS rule in an S9 session modification acknowledgement message of said S9 session to send to said visited PCRF; and after receiving said S9 session modification acknowledgement message, said visited PCRF including said default QoS rule in a gateway control session establishment acknowledgement message to send to said destination BBERF according to an address of the destination BBERF included in said S9 session modification acknowledgement message.

3. The method according to claim 1, wherein said session identity information includes a user identity and a packet data network identity.

4. A method for a Bearer Binding and Event Report Function (BBERF) relocation in a local breakout roaming scenario, which is used in a process of the BBERF relocation after establishing a first Internet Protocol (IP) Connectivity Access Network (IP-CAN) session for a User Equipment (UE) and establishing a first gateway control session, a first Gx session, an S9 session and a first subsession of the S9 session which are used to perform policy control to said first IP-CAN session in an Evolved Packet System (EPS), said method comprising:

establishing a second gateway control session between a destination BBERF and a visited Policy and Charging Rules Function (PCRF); and if an IP-CAN session modification indication message sent by a Policy and Charging Enforcement Function (PCEF) is received, said visited PCRF linking said first Gx session that said IP-CAN session modification indication message requests to modify to said second gateway control session and said first subsession according to session identity information; or if an IP-CAN session establishment indication message sent by said PCEF is received, said visited PCRF linking a second Gx session that said IP-CAN session establishment indication message requests to establish to said second gateway control session and said first subsession according to session identity information.

5. The method according to claim 4, after the step of said visited PCRF linking said first Gx session to said second gateway control session and said first subsession, said method further comprising: said visited PCRF obtaining a policy, which is modified by a home PCRF for a user, through said first subsession, and sending a Policy and Charging Control (PCC) rule in said policy to said PCEF through said first Gx session and sending a Quality of Service (QoS) rule in said policy to said destination BBERF by said second gateway control session;

or after the step of said visited PCRF linking said second Gx session to said second gateway control session and said first subsession, said method further comprising: said visited PCRF obtaining a default policy, which is newly made by said home PCRF for the user, through said first subsession, and sending a PCC rule in said default policy to said PCEF through said second Gx session and sending a QoS rule in said default policy to said destination BBERF through said second gateway control session.

6. The method according to claim 5, wherein after the step of said visited PCRF linking said first Gx session to said second gateway control session and said first subsession, the step of said visited PCRF obtaining the policy modified by said home PCRF for the user comprises: said visited PCRF sending an S9 session modification indication message including an enforcement indication to said home PCRF, wherein said enforcement indication is used for indicating said home PCRF to modify said policy for the user; after receiving said S9 session modification indication message, said home PCRF including said policy modified for the user in an S9 session modification acknowledgement message to send to said visited PCRF according to said enforcement indication;

or after the step of said visited PCRF linking said second Gx session to said second gateway control session and said first subsession, the step of said visited PCRF obtaining the default policy newly made by said home PCRF for the user comprises: said visited PCRF sending an S9 session modification indication message including an enforcement indication to said home PCRF, wherein said enforcement indication is used for indicating said home PCRF to make said default policy for the user; after receiving said S9 session modification indication message, said home PCRF including said default policy made by said home PCRF for the user in an S9 session modification acknowledgement message to send to said visited PCRF according to said enforcement indication.

7. The method according to claim 4,
after the step of said visited PCRF linking said first Gx session to said second gateway control session and said first subsession, said method further comprising: said visited PCRF obtaining a policy, which is modified by a home PCRF for a user, through said first subsession and sending a Policy and Charging Control (PCC) rule in said policy to said PCEF through said first Gx session, and making a corresponding Quality of Service (QoS) rule according to said PCC rule and sending said QoS rule to said destination BBERF through said second gateway control session;

or after said visited PCRF linking said second Gx session to said second gateway control session and said first subsession, said method further comprising: said visited PCRF obtaining a default policy, which is newly made by said home PCRF for the user, through said first subsession and sending a PCC rule in said default policy to said PCEF through said second Gx session, and making a corresponding QoS rule according to said PCC rule and sending said QoS rule to said destination BBERF through said second gateway control session.

8. The method according to claim 7, wherein
after the step of said visited PCRF linking said first Gx session to said second gateway control session and said first subsession, the step of said visited PCRF obtaining the policy modified by said home PCRF for the user comprises: said visited PCRF sending an S9 session modification indication message including an enforcement indication to said home PCRF, wherein said enforcement indication is used for indicating said home PCRF to modify said policy for the user; after receiving said S9 session modification indication message, said home PCRF including said policy modified for the user in an S9 session modification acknowledgement message to send said visited PCRF according said enforcement indication;

or after the step of said visited PCRF linking said second Gx session to said second gateway control session and said first subsession, the step of said visited PCRF obtaining the default policy newly made by said home PCRF for the user comprises: said visited PCRF sending an S9 session modification indication message including an enforcement indication to said home PCRF, wherein said enforcement indication is used for indicating said home PCRF to make said default policy for the user; after receiving said S9 session modification indication message, said home PCRF including said default policy made by said home PCRF for the user in an S9 session modification acknowledgement message to send to said visited PCRF according to said enforcement indication.

9. The method according to claim 4, wherein the step of establishing the second gateway control session between the destination BBERF and the visited PCRF comprises:
said destination BBERF sending a gateway control session establishment indication message to said visited PCRF, wherein said gateway control session establishment indication message includes an deferred linking indication, a bearer attribute of an access network and session identity information; and after receiving said gateway control session establishment indication message, said visited PCRF searching a default Quality of Service (QoS) rule corresponding to said session identity information according to said deferred liking indication, modifying said default QoS rule according to said bearer attribute of the access network, and then sending the modified default QoS rule to said destination BBERF through a gateway control session establishment acknowledgement message.

10. The method according to claim 4, wherein said session identity information includes a user identity and a packet data network identity.

11. A system for a Bearer Binding and Event Report Function (BBERF) relocation comprising: a first processor and a first storage device in a network element that a visited Policy and Charging Rule Function (PCRF) is located, a second processor and a second storage device in a network element that a home PCRF is located, and a third processor and a third storage device in a network element that a Policy and Charging Execution Function (PCEF) is located, a forth processor and a forth storage device in a network element that a BBERF is located, each storage device for storing processor executable instructions that when executed by the corresponding processor cause the corresponding processor to perform the steps in the following function entities: after establishing a first IP Connectivity Access Network (IP-CAN) session for a User Equipment (UE) in an Evolved Packet System (EPS) and establishing a first gateway control session, a first Gx session, an S9 session and a first subsession of the S9 session that are used to perform policy control to the first IP-CAN session, and in a process of the BBERF relocation in a local breakout roaming scenario:

the PCEF is configured to: send an IP-CAN session modification indication message or an IP-CAN session establishment indication message to the visited PCRF;

the BBERF is configured to: establish a second gateway control session between the BBERF and the visited PCRF when the BBERF is a destination BBERF;

the visited PCRF is configured to: link said first Gx session that said IP-CAN session modification indication message requests to modify to said second gateway control session and said first subsession according to session identity information; or link a second Gx session that said IP-CAN session establishment indication message requests to establish to said second gateway control session and said first subsession according to session identity information;

the home PCRF is configured to: newly make a policy for a user or modify a policy for a user, and provide the policy to said visited PCRF through said first subsession.

12. The system according to claim 11, wherein
said visited PCRF is further configured to: obtain the policy, which is modified by the home PCRF for the user, through said first subsession after linking said first Gx session to said second gateway control session and said first subsession, and send a Policy and Charging Control (PCC) rule in said policy to said PCEF by said first Gx session and send a Quality of Service (QoS) rule in said policy to said destination BBERF by said second gateway control session;

or said visited PCRF is further configured to: obtain a default policy, which is newly made by said home PCRF for the user, through said first subsession after linking said second Gx session to said second gateway control session and said first subsession, and send a PCC rule in said default policy to said PCEF by said second Gx session and send a QoS rule in said default policy to said destination BBERF by said second gateway control session.

13. The system according to claim 12, wherein
said visited PCRF is configured to obtain the policy modified by said home PCRF for the user in a following way: said visited PCRF sending an S9 session modification indication message including an enforcement indication to said home PCRF, wherein said enforcement indication is used for indicating said home PCRF to modify said policy for the user; and receiving an S9 session modification acknowledgement message including said policy modified for the user sent form said home PCRF; and said home PCRF is further configured to: include said policy modified for the user in the S9 session modification acknowledgement message after receiving said S9 session modification indication message to send to said visited PCRF according to said enforcement indication;

or said visited PCRF is configured to obtain the policy modified by said home PCRF for the user in a following way: sending an S9 session modification indication message including an enforcement indication to said home PCRF, wherein said enforcement indication is used for indicating said home PCRF to make said default policy for the user; and receiving an S9 session modification acknowledgement message including said default policy made by said home PCRF; and said home PCRF is further configured to: include said default policy made by said home PCRF for the user in the S9 session modification acknowledgement message to send to said visited PCRF according to said enforcement indication.

14. The system according to claim 11,
said visited PCRF is further configured to: obtain the policy, which is modified by the home PCRF for the user, through said first subsession after linking said first Gx session to said second gateway control session and said first subsession, and send a Policy and Charging Control (PCC) rule in said policy to said PCEF by said first Gx session, and make a corresponding Quality of Service (QoS) rule according to said PCC rule and then send said QoS rule to said destination BBERF by said second gateway control session;

or said visited PCRF is configured to: obtain a default policy, which is newly made by said home PCRF for the user, through said first subsession after linking said second Gx session to said second gateway control session and said first subsession, and send a PCC rule in said default policy to said PCEF by said second Gx session, and make a corresponding QoS rule according to said PCC rule and then send said QoS rule to said destination BBERF by said second gateway control session.

15. A policy and charging rule function (PCRF), comprising a processor and a storage in a network element that a visited PCRF is located, the storage device for storing processor executable instructions that when executed by the processor cause the processor to perform the steps in the visited PCRF in a breakout roaming scenario, wherein in a process of a Bearer Binding and Event Report Function (BBERF) relocation after establishing a first Internet Protocol (IP) Connectivity Access Network (IP-CAN) session for a User Equipment (UE) and establishing a first gateway control session, a first Gx session, an S9 session and a first subsession of the S9 session which are used to perform policy control to said first IP-CAN session in an Evolved Packet System (EPS), the visited PCRF is configured to:
establish a second gateway control session with a destination BBERF; and
receive an IP-CAN session modification indication message sent by a Policy and Charging Enforcement Function (PCEF), and link said first Gx session that said IP-CAN session modification indication message requests to modify to said second gateway control session and said first subsession according to session identity information; or
receive an IP-CAN session establishment indication message sent by said PCEF, and link a second Gx session that said IP-CAN session establishment indication message requests to establish to said second gateway control session and said first subsession according to session identity information.

16. The PCRF according to claim 15, wherein the visited PCRF is further configured to:
obtain a policy, modified by a home PCRF for a user, through said first subsession after linking said first Gx session to said second gateway control session and said first subsession, and send a Policy and Charging Control (PCC) rule in said policy to said PCEF by said first Gx session and send a Quality of Service (QoS) rule in said policy to said destination BBERF by said second gateway control session;

or obtain a default policy, newly made by said home PCRF for the user, through said first subsession after linking said second Gx session to said second gateway control session and said first subsession, and send a PCC rule in said default policy to said PCEF by said second Gx session and send a QoS rule in said default policy to said destination BBERF by said second gateway control session.

17. The PCRF according to claim 16, wherein said visited PCRF is configured to obtain the policy modified by said home PCRF for the user in a following way:
said visited PCRF sending an S9 session modification indication message including an enforcement indication to said home PCRF, wherein said enforcement indication is used for indicating said home PCRF to modify said policy for the user; and receiving an S9 session modification acknowledgement message including said policy modified for the user sent by said home PCRF;

or said visited PCRF sending an S9 session modification indication message including an enforcement indication to said home PCRF, wherein said enforcement indication is used for indicating said home PCRF to make said default policy for the user; and receiving an S9 session modification acknowledgement message including said default policy made by said home PCRF for the user sent from said home PCRF.

18. The PCRF according to claim 15, wherein the visited PCRF is further configured to:
obtain a policy, modified by a home PCRF for a user, through said first subsession after linking said first Gx session to said second gateway control session and said first subsession, and send a Policy and Charging Control (PCC) rule in said policy to said PCEF by said first Gx session, and make a corresponding Quality of Service (QoS) rule according to said PCC rule and then send said QoS rule to said destination BBERF by said second gateway control session;

or obtain a default policy, newly made by said home PCRF for the user, through said first subsession after linking said second Gx session to said second gateway control session and said first subsession, and send a PCC rule in said default policy to said PCEF by said second Gx session, and make a corresponding QoS rule according to said PCC rule and sending said QoS rule to said destination BBERF by said second gateway control session.

19. The PCRF according to claim 18, wherein said visited PCRF is configured to obtain the policy modified by said home PCRF for the user in a following way:

said visited PCRF sending an S9 session modification indication message including an enforcement indication to said home PCRF, wherein said enforcement indication is used for indicating said home PCRF to modify said policy for the user; and receiving an S9 session modification acknowledgement message including said policy modified for the user sent by said home PCRF;

or said visited PCRF sending an S9 session modification indication message including an enforcement indication to said home PCRF, wherein said enforcement indication is used for indicating said home PCRF to make said default policy for the user; and receiving an S9 session modification acknowledgement message including said default policy made by said home PCRF for the user sent from said home PCRF.

20. The PCRF according to claim 15, wherein said visited PCRF is configured to establish the second gateway control session with the destination BBERF in a following way:

receiving a gateway control session establishment indication message including an deferred linking indication, a bearer attribute of an access network and session identity information sent from said destination BBERF; and after receiving said gateway control session establishment indication message, said visited PCRF searching a default Quality of Service (QoS) rule corresponding to said session identity information according to said deferred liking indication, modifying said default QoS rule according to said bearer attribute of the access network, and then sending the QoS rule to said destination BBERF through a gateway control session establishment acknowledgement message.

* * * * *